March 3, 1970 M. E. GERRY 3,498,703
SOUND SYNCHRONIZED CAMERA-PROJECTOR
Filed July 11, 1966 9 Sheets-Sheet 1

INVENTOR.
Martin E Gerry

March 3, 1970   M. E. GERRY   3,498,703
SOUND SYNCHRONIZED CAMERA-PROJECTOR
Filed July 11, 1966   9 Sheets-Sheet 2

INVENTOR.
Martin E. Gerry

March 3, 1970  M. E. GERRY  3,498,703
SOUND SYNCHRONIZED CAMERA-PROJECTOR
Filed July 11, 1966  9 Sheets-Sheet 3

INVENTOR.
Martin E Gerry

March 3, 1970 M. E. GERRY 3,498,703
SOUND SYNCHRONIZED CAMERA-PROJECTOR
Filed July 11, 1966 9 Sheets-Sheet 4
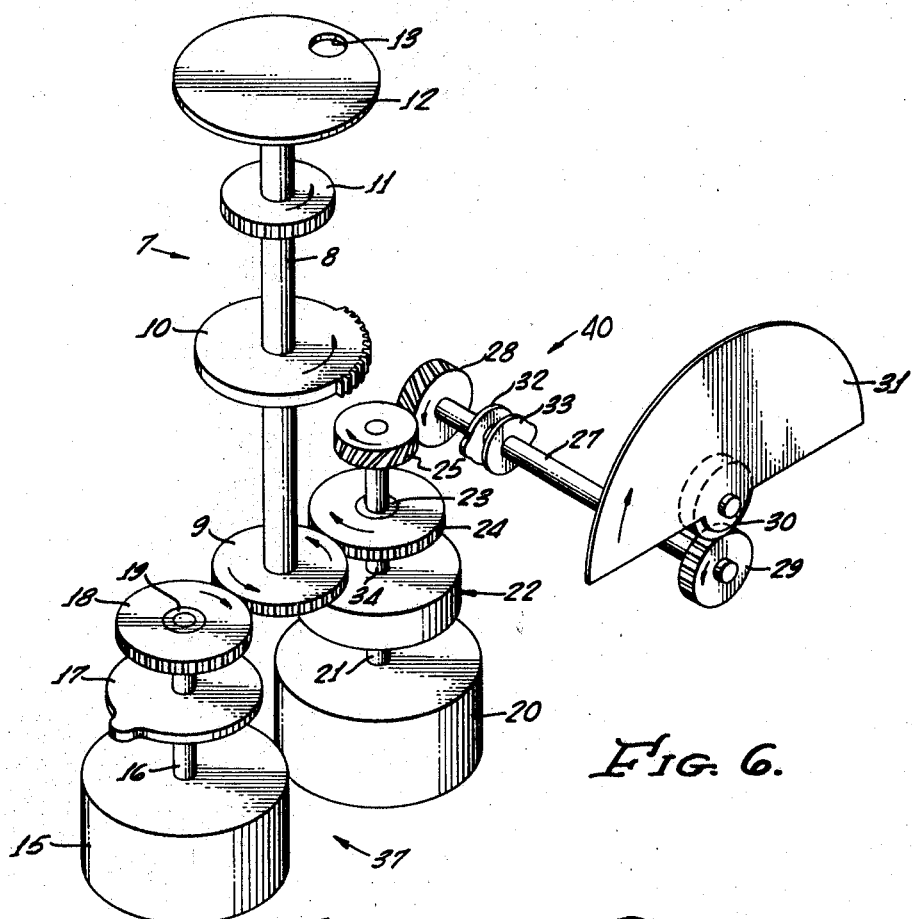
FIG. 6.
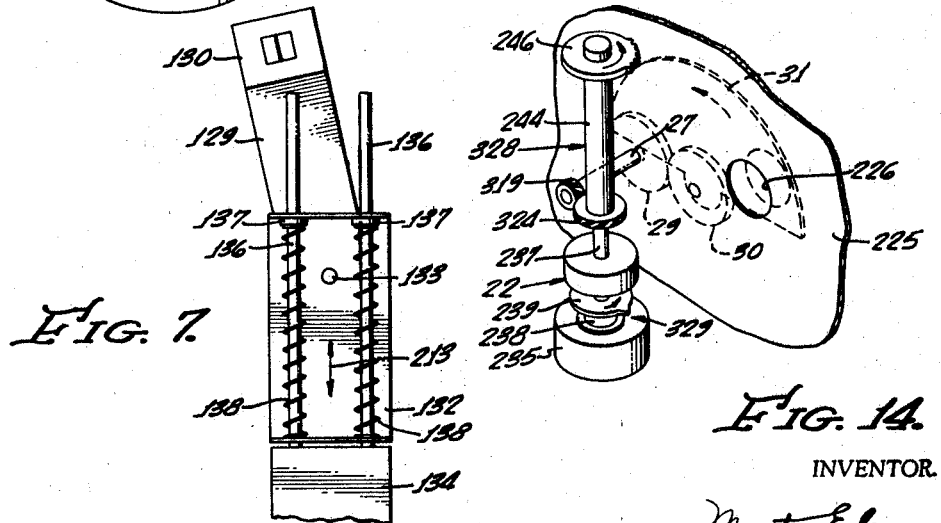
FIG. 7.
FIG. 14.
INVENTOR.
Martin E Gerry INVENTOR.
Martin E Gerry March 3, 1970 M. E. GERRY 3,498,703
SOUND SYNCHRONIZED CAMERA-PROJECTOR
Filed July 11, 1966 9 Sheets-Sheet 6
FIG. 9.
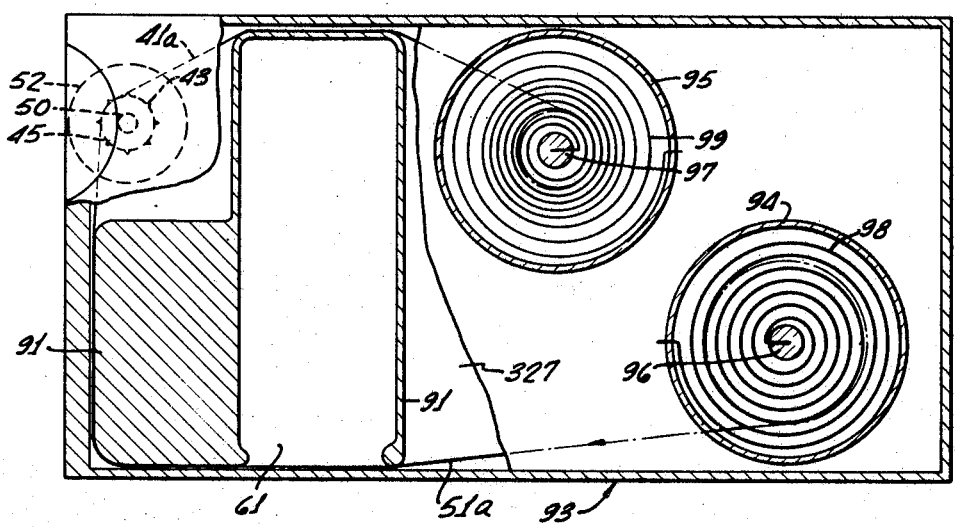
FIG. 18.
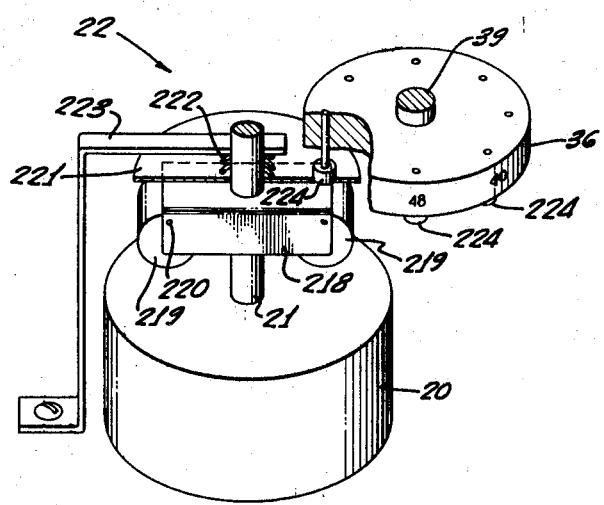
FIG. 10.
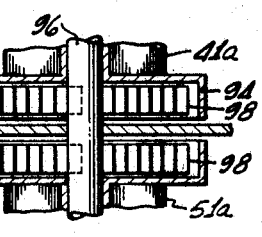
FIG. 11.
INVENTOR.
Martin E Gerry

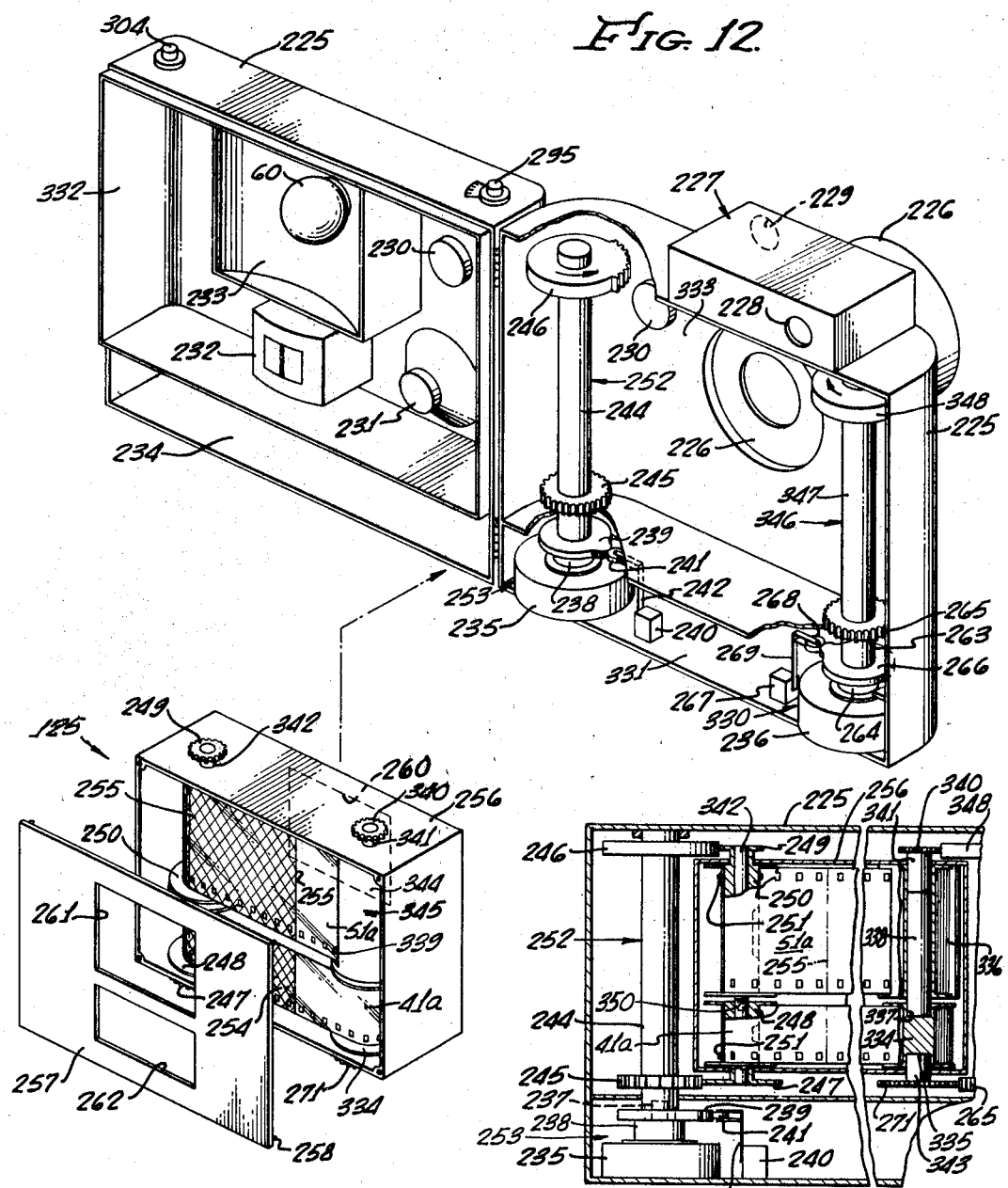

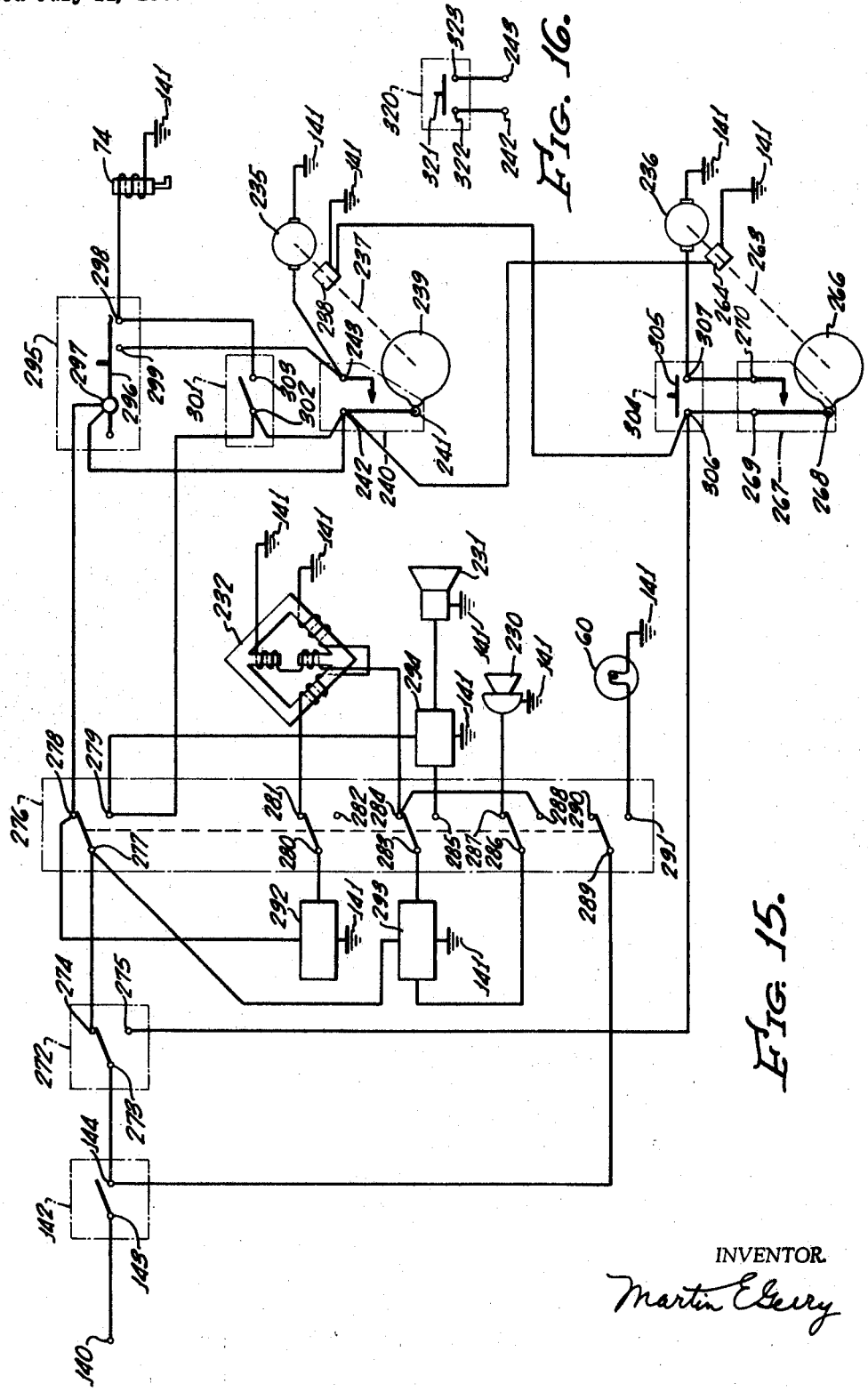

Fig. 17.

United States Patent Office 3,498,703
Patented Mar. 3, 1970

3,498,703
SOUND SYNCHRONIZED CAMERA-PROJECTOR
Martin E. Gerry, 13452 Winthrope St.,
Santa Ana, Calif. 92705
Filed July 11, 1966, Ser. No. 564,141
Int. Cl. G03b 31/04
U.S. Cl. 352—31          17 Claims

ABSTRACT OF THE DISCLOSURE

A combination camera-projector with sound is provided having movie or still-image modes of operation. Included are a group of cartridges combining separate film and sound tape for recording and reproducing sound relating to images on the film. The film and sound track tape are transported within the cartridge and are moved by external mechanisms. The external mechanisms provide for moving the film continuously with the sound tape synchronized to the film when in the movie mode, or when in the still-image mode the film is transported one frame at a time with accompanying portions of the sound tape, each portion of sound tape having sound relating to a particular frame of the film. A shutter is provided which is linked to the external mechanism and permits optical communication in accordance with the frame rate of transportation during the movie mode, and is properly positioned in the still-image mode by control mechanism. Other mechanisms for scanning the sound tape are provided so that a magnetic head may record sound on or reproduce sound from the magnetic tape. Control circuits of the electromechanical type are provided for programming lengths of tape and film in sequence or programming single frames of film and accompanying sound track tape in either the camera or projector modes of the apparatus.

---

The present invention relates to a basic apparatus for optically projecting or photographing images of visual information and simultaneously recording or reproducing sound corresponding to the photographic images.

One objective of this invention is to devise a basic still image optical projector with sound which is convertible into a still image camera with sound and visa versa.

Another objective of this invention is to adapt the combination of still image projector and camera with sound to a motion picture projector and camera with sound.

Other objectives inlude various combinations of still image projectors, still image cameras, motion picture projectors, and motion picture cameras.

Still other objectives achieved by this invention include various means of recording and reproducing sound including the conventional magnetic flux rate of change means as well as the magnetic flux response means.

Briefly, in accordance with a preferred form of the present invention, a combined still image and motion picture camera and projector with sound is detailed. This apparatus includes a unique universal tape driving means which has the capability of driving a rotatable movie shutter while a still image shutter is automatically held open, and conversely, holding the movie shutter open while the still image shutter is being operated. The invention makes use of a cartridge containing a tape drive means, a photographic tape, and a magnetic sound recording tape. This cartridge is inserted into the apparatus. The tape drive means is driven by the universal tape driving means, which controls the transportation of the photographic tape and a sound tape in a unique manner. Provision is made for automatic insertion of a projector lamp assembly when the cartridge is inserted into the apparatus. Mechanical simplification of the record-reproduce head scanning means is achieved by making use of the flux responsive record-reproduce head, thereby simplifying the still image projector and camera combination with sound, which is one of the configurations derived.

Also included are reliable automatic control circuits which enable this multiple purpose apparatus to properly function under any selected mode of operation.

A more thorough understanding of this invention may be obtained by a study of the detailed specification taken in conjunction with the accompanying drawings in which:

FIG. 6 is a perspective view showing details of the prime mover of the universal tape transport drive means, the universal tape transport drive means, and the movie shutter assembly mechanically coupled to each other;

FIG. 7 is an elevation view of a portion of the sound track record-reproduce assembly with details of the horizontal and vertical motion members;

FIG. 9 is a sectional view of the lower section of a cartridge with spring loaded tape storage and takeup spools used in conjunction with this invention;

FIG. 10 is a perspective view partially in cross-section of the frame rate adjust dial in combination with the frame rate control mechanism and the movie frames advance motor;

FIG. 11 is a cross-sectional view showing details of one of the free wheeling clutches used within the prime mover of this invention;

FIG. 12 is a perspective view partially in cross-section of a still frame and sound camera-projector combination together with a sound and photographic tape cartridge which represents one specific form of this invention;

FIG. 13 is a portion of an elevation view partially in cross-section of the still frame and sound camera-projector detailing the universal tape transport drive means and the sound and visual information takeup and rewind spools;

FIG. 14 is a perspective view of a portion of a movie camera-projector combination detailing the universal tape transport drive means the movie shutter assembly mechanically coupled to the universal tape transport drive means, and the prime mover assembly of a specific form of this invention;

FIG. 15 is an electrical schematic of the control and record-reproduce circuits of the still frames and sound camera-projector combination;

FIG. 16 is a portion of a schematic of the movie camera-projector combination push button used for activating the prime mover driving the universal tape transport drive means;

FIG. 17 is an electrical schematic of the control and record-reproduce circuits of this invention wherein recording and reproducing of sound is achieved by magnetic flux responsive means;

FIG. 18 is an elevation view partially in cross-section of a portion of the cartridge with spring loaded tape storage and takeup spools.

Figure 1:
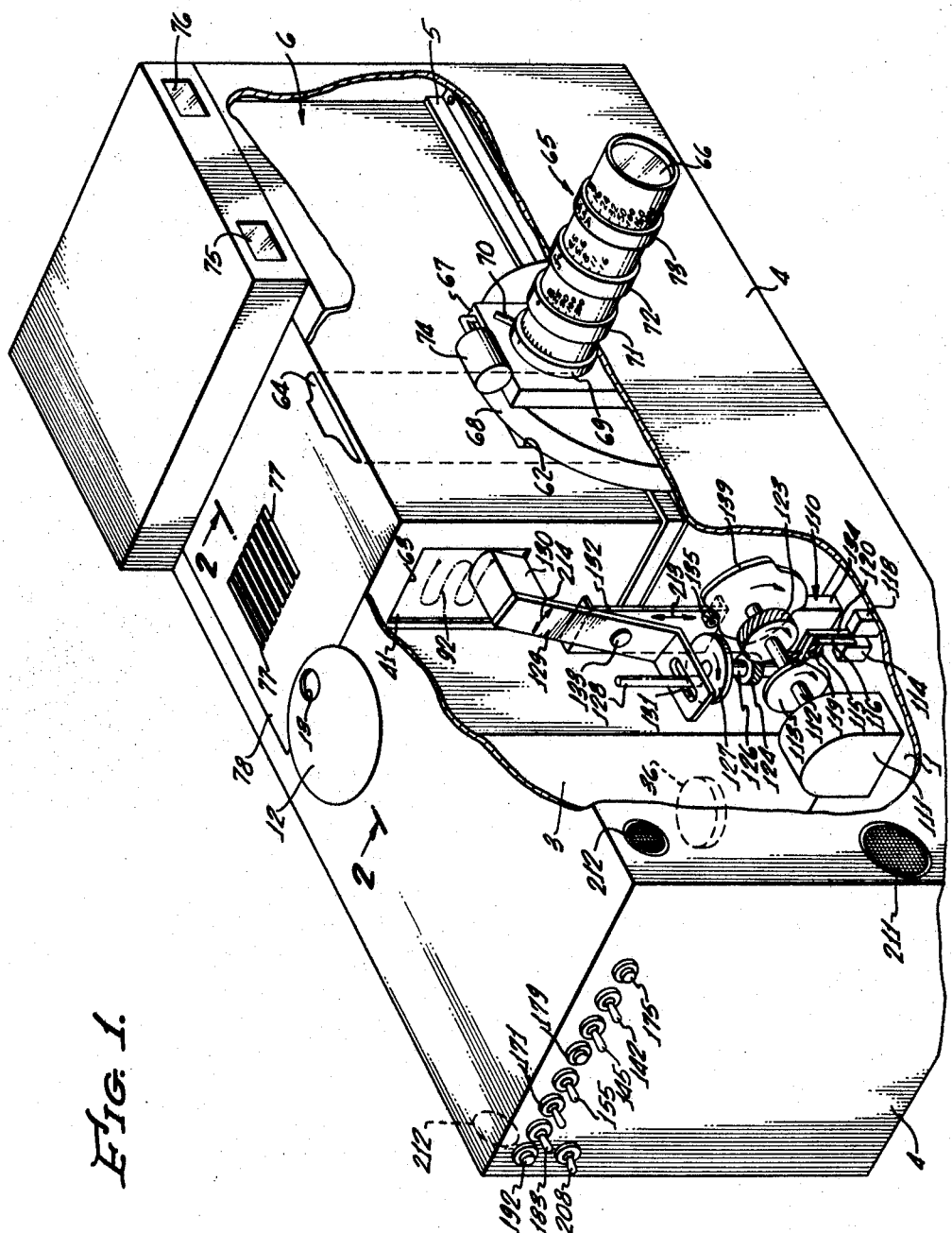
FIG. 1 is a perspective view partially in cross-section of a combination still and movie projector and camera combination with sound, constructed in accordance with a preferred form of this invention.

*Structural relationship of the still and movie camera-projector apparatus.*—Referring to FIGS. 1, 2, 3, 4, 6, 7, 10, and 11, the lower portion of the secondary base plate 2 is spatially separated by means of vertical structural members (not shown) and is parallel to the main base plate 1. The upper portion of the secondary base plate 215 is mechanically attached and is parallel to a portion of the lower portion of the secondary base plate 2 to provide the required supporting strength and alignment for sleeve bearing 14 which is press fitted into a common hole in plates 2 and 215. Another sleeve type bearing 14 is also mechanically affixed within hole in the inner surface of external enclosure 4. Guide bracket 5 is mechanically affixed to base plate 2 permitting the alignment of cartridge 6. Still frames advance motor 15 is mechanically affixed to main base plate 1, still frames advance motor synchronizing microswitch 102 and automatic sequencing still visual information frames and sound track microswitch 106, both microswitches 102 and 106 are mechanically affixed to main base plate 1, shaft 16 of motor 15 on which is mechanically affixed synchronizing cam 17, and follower roller 107 of microswitch 106 normally cooperates with the low portion of cam 17, and follower roller 103 of microswitch 102 normally cooperates with the high portion of cam 17. Free wheeling clutch 19 is circumjacent to and mechanically cooperates with shaft 16, the race 38 of clutch 19 has inclined planes 216 and needle bearings 217 which are spatially equally separated from each other and are situated betweeen the circumferential surface of shaft 16 and depressions in the inclined planes 216 so that rotation of shaft 16 in the normal rotational direction of motor 15 will cause the needle bearings 217 to be rolled out of the inclined plane depressions and wedged between shaft 16 and race 38 thereby causing rotation of race 38 in the same direction as rotational motion of shaft 16 when motor 15 is energized. Conversely when shaft 16 is not being rotated by motor 15, race 38 may be rotated freely in the same direction as it is normally driven by shaft 16 by an external driving means. Race 38 is mechanically affixed at the axis of rotation of still frame advance drive gear 18. Movie frames advance motor 20 is mechanically affixed to main base plate 1, and shaft 21 of motor 20 has mechanically coupled thereto frame rate control mechanism 22, the output shaft 31 of mechanism 22 has cooperating therewith free wheeling clutch 23 which is identical in construction to clutch 19, and clutch 23 is also coaxial with movie frames advance gear 24 and mechanically affixed to the race of clutch 23. Shaft 31 extends into and is mechanically affixed at the axis of rotation of movie transport means drive gear 25. It should be noted that FIG. 11 shows the cross-section of the combination shaft 16 and clutch 19 as seen when looking up at gear 18. Frame rate control mechanism 22 has dial 36 rotatably mounted on shaft 39. Dial 36 has a plural number of frame rate adjusting pins 224 for selection of 8, 16, 24, 32, 40, 48, 56, and 64 frames per second. These pins 224 each have different lengths and when dial 36 is rotated manually the pins 224 cooperate with a rotating friction plate 221. Cylindrical rotatable weights 219 are eccentrically mounted at eccentric pivot position points 220 of rotating weight carriage 218. Output shaft of frame rate control mechanism 22 extends through a hole at the center of rotating friction plate 221, and plate 221 is in cooperation with upper surface of rotating weight carriage 218. Friction plate compression spring 222 coaxial with output shaft of frame rate control mechanism 22 is mounted between the surfaces of friction plate 221 and bracket 223, bracket 223 being mechanically affixed to main mounting base 1. Spring 222 is used to return carriage 218 and friction plate 221 to their initial position prior to rotational motion of shaft 21. When any pin 224 cooperates with surface of friction plate 221 it establishes the limit of translation of friction plate 221 in a direction away from motor 20, so that when motor 20 is energized and shaft 21 thereby rotated, weights 219 will be swung outward due to rotation of shaft 21. A shorter pin 224 will cause the least amount of friction and hence permit weights 219 to swing out forming a larger arc, and will also cause a greater rotational velocity of rotating weight carriage 218, and conversely a longer pin 224 will cause more friction and a lower rotational velocity. The pins 224 are calibrated in length to give exact multiples of 8 frames per second rotational speed and dial 36 is selectively rotated manually to obtain the desired number of frames per second. Mechanism 22 is used as standard component of movie cameras and hence detailed analysis of operational characteristics is known in the art. Coupled to and mechanically cooperating with gear 25 at a 90 degree angle of cooperative relationship is movie shutter drive coupling gear 28. Gears 24 and 25 are driven clockwise as viewed from the top of these gears and gear 28 is rotated counterclockwise as viewed from the front of the apparatus. Gear 28 mechanically bears movie shutter drive shaft 27 on which is mechanically affixed movie frames motor advance synchronizing cam 32, movie shutter open positioning cam 33, and movie shutter drive gear 29 which cooperates with movie shutter gear 30, gear 30 being mechanically affixed to a semi-circular shaped clockwise rotatable movie shutter 31. Two vertical bracket members (not shown) affixed to main base 1, retain shaft 27. Also affixed to main base 1 is movie frames advance motor synchronizing microswitch 200 whose follower roller 201 normally cooperates with the high portion of cam 32, and movie shutter open positioning microswitch 204 whose follower roller 205 normally cooperates with the low portion of cam 33. Notably, the prime mover 37 which drives the universal tape transport drive means 7 and the movie shutter assembly 40, is comprised of motors 15 and 20, cams 17, 32, and 33, microswitches 102, 204, and 200, gears 18, 23, and 25, free wheeling clutches 19 and 23, and frame rate control mechanism 22. The movie shutter assembly 40 is comprised of gears 28, 29, and 30, shaft 27, and movie shutter 31. The universal tape transport drive means 7 is comprised of drive shaft 8, drive gear 9, sound tape transport driving gear 11, visual information tape transport driving partial gear 10, and manual dial 12 with finger hole 13 therein for manual rotation of drive shaft 8. Gears 9, 10, 11, and dial 10 are spatially mechanically affixed to drive shaft 8. Gear 9 is mechanically coupled and cooperates with gears 18 and 24 of prime mover assembly 37. As shown in FIG. 6, motors 15 or 16 when energized are always driven in a clockwise direction thereby always driving gear 9 in a counterclockwise direction. Remembering that the location of free wheeling clutches 19 and 23 respectively at the axis of rotation of gears 18 and 24 will enable the free wheeling action so that when motor 15 is energized thereby driving gear 18 and gear 9 mechanically coupled thereto, gear 24 will rotate freely and shafts 21 and 31 and gear 25 will be stationary. Conversely, when motor 20 is energized, frame rate selector mechanism 22, gear 24, gear 25, and entire movie shutter assembly 40 will be driven in the direction of the arrows, but gear 18 will be rotated freely while motor 15 is deenergized and shaft 16 is at standstill. It is therefore obvious that decoupling the movie prime mover portion from the universal tape transport drive means is avoided while the still frames prime mover portion is energized and being driven, and conversely, decoupling the still prime mover portion from the universal tape transport drive means is avoided while the movie prime mover portion is energized and being driven.

The universal tape transport drive means 7 is held mechanically at the lower end by retaining the end of shaft 8 in a sleeve bearing 14 which is mechanically affixed into combination base plates 2 and 215, and supported at the upper surface of plate 215 by a flange which is an integral part of shaft 8. Partial gear 10 extends through an aperture of cartridge case 6 or 84 or 93 for cooperative engagement with the visual information tape transport driven gear 53 during the duty cycle thereof, and gear 11 extends partially through apertures of cartridge cases 6 or 35 or 93 for cooperative engagement with sound tape transport driven gear 52. The upper end of shaft 8 is also mechanically held in a sleeve bearing 14 which is mechanically held in a hole in a depression of external enclosure 4 and a keyed extension at the axis of rotation of manual dial 12 extends into a hole with a keyway at the upper end and at the axis of rotation of shaft 8, shaft 8 thereby mechanically holding dial 12. Enclosure 3 partially encloses part of tape transport drive means 7.

Figure 2:
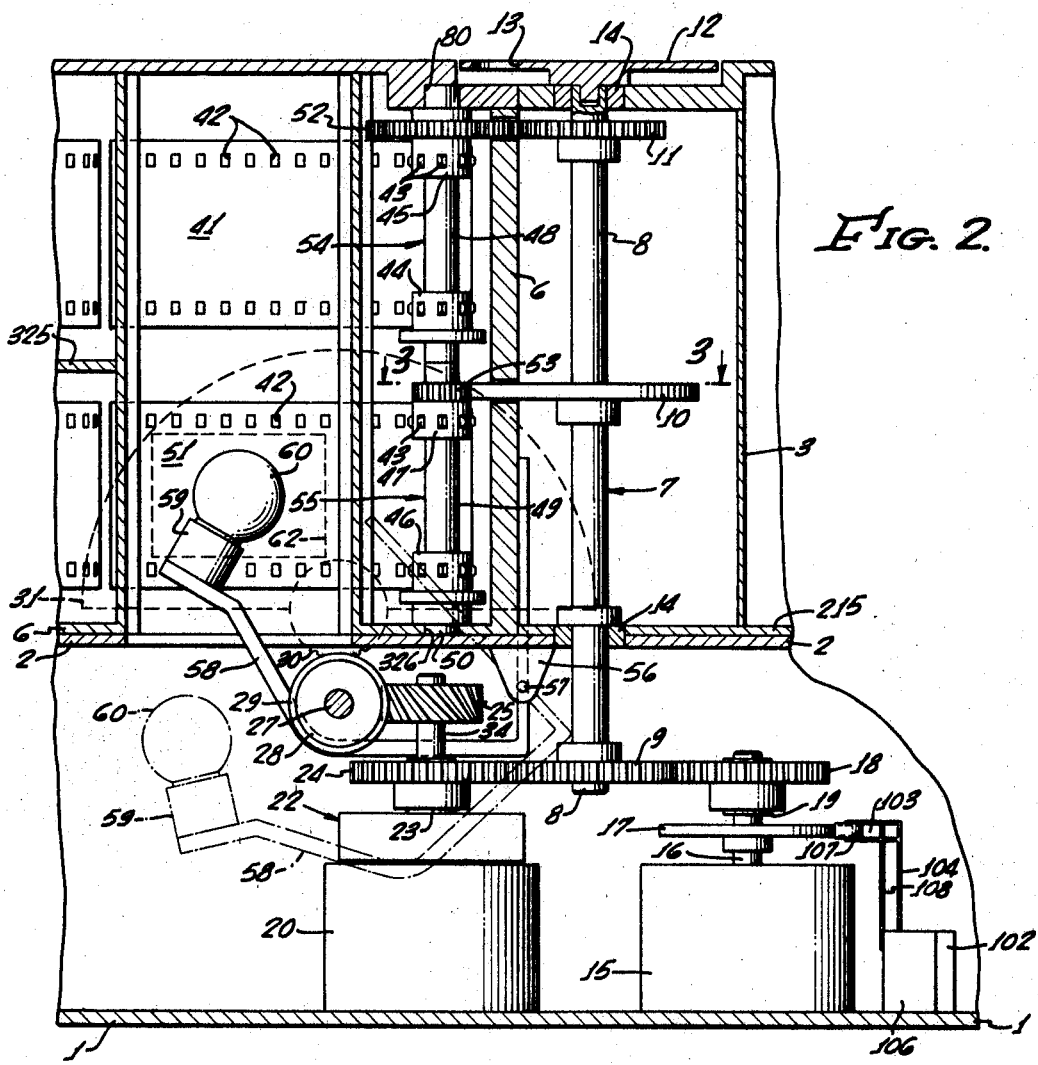
FIG. 2 is an elevation view partially in cross-section taken along line 2—2 of FIG. 1 detailing the universal tape transport drive means, the prime mover of the universal tape transport drive means, the sound tape and visual information tape transport means, and the projection lamp mechanism.
Figure 3:
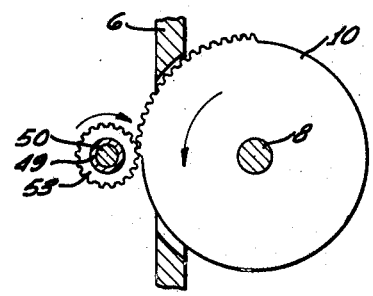
FIG. 3 is a top view partially in cross-section taken along line 3—3 of FIG. 2 showing details of a partial gear of the universal tape transport drive means in cooperation with the visual information tape transport driven gear.
Figure 4:
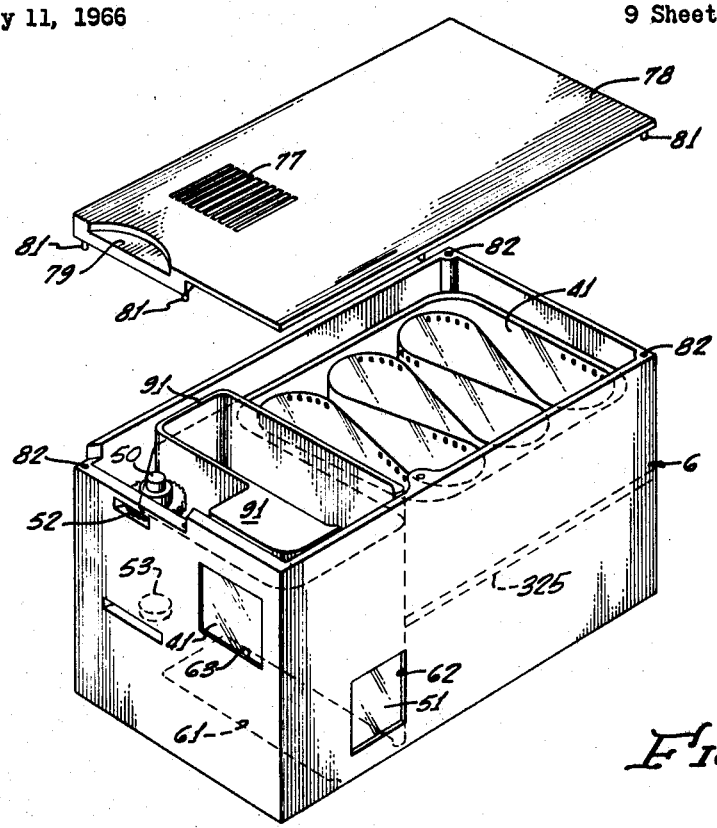
FIG. 4 is a perspective view of a cartridge used in conjunction with this invention.
Figure 5:
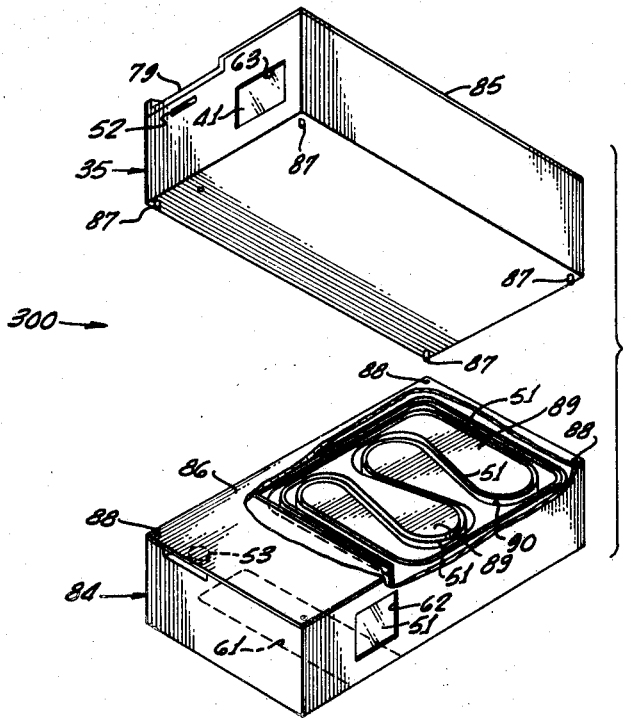
FIG. 5 is a perspective view partially in cross-section of a dual cartridge used in conjunction with this invention.

*Optical assembly.*—Referring to FIGS. 1 and 2, movie shutter housing 68 is mechanically affixed to base plate 2, and rotatable shutter 31 is retained in housing 68. Still photographic shutter housing 67 retains a conventional mechanical shutter capable of a multiple speed operation and a bulb position setting which enables maintaining the mechanical shutter in open mode by virtue of electrically energizing a solenoid 74 affixed to the mechanical shutter housing and the armature of solenoid 74 mechanically linked with the triggering means of the mechanical shutter. The open mode position is required when the movie shutter is operable so that light may pass through lens assembly 86. Solenoid 74 also triggers the mechanical shutter at specific preselected shutter speeds during the photographing of still visual information frames. Shutter housing 67 is mechanically affixed to movie shutter housing 68. Shutter assembly housing 67 has mechanically affixed thereto as in a conventional camera, assembly 65 comprising a focus ring 69, a focus and range finding adjust arm 70, a still photograph camera shutter speed adjust ring 71, a light aperture iris adjust ring 72, an ASA film speed selector ring 73, and lens assembly 66. Electronically interconnected with the ASA setting is iris positioning and still photograph camera shutter speed setting in combination with a light sensing photocell 76 for automatic setting of the iris and shutter speed at any given ASA film speed. Inasmuch as the electronics therefor is conventional to an automatic still photographic camera, these details are not shown herein. Camera viewer and rangefinder viewing aperture 75 is also conventional to camera with a rangefinder and these details are not shown, but focus and range finding adjust arm 70 is manually operated until the two images of the object desired to photograph as seen as the other or viewing end of aperture 75 (not shown) are superimposed upon each other to indicate proper focusing setting has been located. Secondary base plate 2 has projection lamp assembly mounting extension 56 mechanically affixed thereto, and projection lamp mounting bracket 58 is mechanically mounted on extension 56 by means of a pivot pin 57, and bracket 58 is pivotable about pivot pin 57, projection lamp socket 59 is mounted on projection lamp mounting bracket 58 and projection lamp 60 is mechanically held in socket 59. Projection lamp mounting bracket 58 is generally a right angular shaped bracket, its upper portion extending partially into the location normally occupied by either cartridges 6, 300, or 93 so that when any of these cartridges are inserted the upper or vertical member of the projection lamp bracket is pushed by cooperation of the cartridge case with the vertical member, pivoting bracket 58 about pivot pin 57 and injecting the lower portion of bracket 58 with the socket 59 and projection lamp 60 which is mechanically mounted on the end of the horizontal member of bracket 58 into aperture 61 of the case of cartridge 6, case 84 of dual cartridge 300, or case of cartridge 93, whichever cartridge is being injected into the apparatus, which thereby permits the illumination of images of the visual information frame tape when projection lamp 60 is energized, inasmuch as lamp 60 is then directly situated behind visual information frame tape 51.

*Electromechanical clutch as a substitute for free wheeling clutch.*—Referring to FIGS. 2, 6, and 11, the free wheeling clutch details were hereinabove described. However, the electromechanical clutch as described as assembly 109 of FIG. 4 of U.S. Patent No. 3,251,263, patented May 17, 1966 by the same inventor under application Ser. No. 263,164 filed Mar. 6, 1963, may be used by deleting clutch 19 and mechanically affixing gear 18 directly to end of shaft 16 and inserting said electromechanical clutch in series with shaft 16 at output of motor 15 and affixing cam 17 and gear 18 to an output shaft of said electromechanical clutch and said electromechanical clutch electrical terminals are electrically conneted to the terminals of motor 20 so that when motor 20 is eltrically energized the said electromechanical clutch decouples motor 15 from cam 17 and gear 18 thereby removing the mechanical load presented by motor 15. Similarly, deleting clutch 23 and mechanically affixing gear 24 directly to shaft 34 and inserting said electromechanical clutch in series with shaft 21 at output of motor 20 and affixing frame rate selector mechanism 22, gear 24, and gear 25 to an output shaft of said electromechanical clutch, electrical terminals are electrically connected to the terminals of motor 15, so that when motor 15 is electrically energized the said electromechanical clutch decouples motor 20 from frame rate selector mechanism 22, gear 24, and gear 25, thereby removing the mechanical load presented by motor 20.

*Mechanical relationship of cartridges with respect to still and movie camera-projector apparatus.*—Referring to FIGS. 1, 2, 3, 4, 5, and 9, either cartridge 6, dual cartridge 300 which includes cartridge cases 35 and 84, or cartridge 93 may be used in combination with the still and movie camera-projector apparatus. Any of these cartridges are manually injected into the apparatus thereby seating any of the said cartridges on secondary base plate 2. These cartridges are guided by guide bracket 5 when being injected into the apparatus, such injection automatically causing injection of the projection lamp 60 as hereinabove described into aperture 61 and being positioned behind tape 51 for illumination of images projected therefrom. Upon injection of any of the aforementioned cartridges, the teeth of gear 11 will cooperate with the teeth of gear 52, and the teeth of partial gear 10 will either be in a cooperative relationship with the teeth of gear 53 if the apparatus is in the movie mode or the power-off mode, or the teeth of partial gear 10 will be 180 degrees displaced with respect to the movie mode or the power-off mode when the said apparatus is in the still mode. When a sound track record-reproduce assembly is used, then record-reproduce head 130 will be in cooperative relationship with the recording surface of record-reproduce tape 41, said record-reproduce head 130 extending into aperture 63. Record-reproduce head 130 operates on the flux rate of change principle and therefore relative motion between tape 41 and head 130 must be relatively fast in order to induce into or sense from a voltage in head 130 of relatively high strength. However, the use of a flux responsive head 232 in lieu of the flux rate of change head 130, permits relatively slow scanning of the tape or relatively slow motion of tape 41 with respect to fixed position head 232, to achieve the same quantity of voice recording or reproduction as with the rate of change head 130. Therefore when head 232 is used, it too may be injected and aligned in aperture 63. Aperture 62 is aligned with shutter housings 67 and 68 and optical assembly 65 so that images of visual information frames may be photographed on or projected from tape 51. In the camera mode, visual information aperture blocking tab 64 may be manually pulled off thereby exposing aperture 62 to the shutters and the said optical assembly.

*Single cartridge with endless tapes.*—Referring to FIGS.

1, 2, 3, and 4, a single cartridge with a tape compartment, a projection lamp compartment, and a tape transport mechanism compartment is created by separator and sound tape backup means 91 which is an integral portion of case of cartridge 6, and which is mechanically affixed to the base of said case of cartridge 6 by a moulding process, inasmuch as the entire case of cartridge 6 and separator means 91 is made of plastic material. Tape backup means portion of separator and backup means 91 is required in order that the sound tape 41 has a solid backup structure when a frame of said tape 41 is being scanned by record-reproduce head 130 which is injected in aperture 63 wherein the said frame of tape 41 is exposed, head 130 cooperating with said exposed frame of tape 41 in said aperture 63. A frame of visual information tape 51 is exposed in aperture 62 in order that said frame may have superimposed thereon or projected therefrom images of visual information. The projection of these images is accomplished by illumination of a projection lamp injected behind tape 51 in aperture 61. The compartment created for folding in tapes 41 and 51 in a generally zig-zag manner, is separated horizontally by means of separation panel 325 which is wedged into ridges (not shown) after tape 51 is loaded but prior to the loading of tape 41. The tapes are unloaded in an inverse procedure for photographic processing, said removable separator 325 being manually removable by inserting a finger in a fingerhole means of separator 325 and pulling upward. Tape 51 has as its support the base of cartridge 6. The case of single cartridge with endless tapes 6 has cover pin retention holes 82 therein for accepting cover retention pins 81 which pins 81 are integral portions of cover 78. Cover 78 has louvers 77 therein positioned directly above aperture 61 so that heat from projection lamp 60 may be convected upward and out through said louvers 77. Depression 79 in cover 78 is provided for admitting in a recessed fashion part of manual dial 12, the other part of dial 12 being recessed in external enclosure 4 of the still and movie camera-projector apparatus. Inserted and cooperatively held in an aperture 326 in base of case of cartridge 6 and oppositely disposed thereto in recess 79 of cover 78 is aperture 80. Said oppositely disposed apertures mechanically hold and retain sound and visual information guide sleeves mounting shaft 50 at the extreme ends of said shaft 50. Coaxial with and circumjacent said shaft 50 is sound tape guide sleeve 48 and visual information tape guide sleeve 49, which abut each other and which are rotatably mounted on said shaft 50. Sleeves 48 and 49 are integral portions respectively of sound tape transport means 54 and visual information frame tape transport means 55. Mechanically affixed near the upper end of sleeve 48 is sound tape transport driven gear 52 with its flange 45 on which are spatially equally situated tape guide and registration sprockets about the circumference of flange 45 for cooperative engagement with tape guiding and registration holes 42 located at the upper edge of sound tape 41. Gear 52, sprockets 42, flange 45, and sound tape guide sleeve 48 are integral portions of sound tape transport means 54. Mechanically affixed near the lower end of sleeve 48, is sound tape guide flange 44 with similar sprockets 43 as in the case of flange 45, for cooperative engagement with a similar set of holes 42 at the lower edge of said tape 41. Flange 44 with sprockets 43 is also an integral portion of the said sound tape transport means 54. When the cover 78 is fitted to the case of cartridge 6, so that cover retention pins 81 are injected into and securely held by cover retention holes 82, the upper end of shaft 50 fits into and is mechanically held in aperture 80, structurally supporting the said shaft 50 within the case of cartridge 6. Mechanically mounted and affixed at the upper end of sleeve 49 is visual information tape transport driven gear 53 which is substantially smaller in diameter than gear 52, and visual information tape guide flange 47 with tape guide and registration sprockets 43 spatially equally arranged about the circumference of flange 47, and are integral portions of flange 47, cooperatively engage holes 42 at the upper edge of tape 51. Likewise, flange 47 is an integral portion of gear 53, and gear 53 and sleeve 49 are both integral portions of visual information tape transport means 55. Likewise, visual information tape guide flange 46 and sprockets 43 spatially equally arranged about the circumference of flange 46 and being integral portions of flange 46, are also integral portions of visual information tape transport means 55, said flange 46 with sprockets thereon being mechanically affixed at the lower end of sleeve 49 and cooperatively engage holes 42 at the lower edge of visual information frame tape 51. Said gears 52 and 53 when driven, transport respectively exactly one frame of sound tape 41 and one frame of visual information tape 51 for each full rotation of the sound tape transport means 54 and the visual information tape transport means 55. However, inasmuch as the universal tape transport drive means 7 by virtue of full gear 11 and partial gear 10 thereof will drive respectively gear 52 and gear 53, gear 52 being driven smoothly and gear 53 being driven impulsively, inasmuch as visual information tape transport means 55 will be transported by cooperative engagement of the segment of gear 10 with teeth therein with the teeth of gear 53, said visual information tape transport means 55 will be in motion only a portion of the cycle (one-fourth of the cycle) of the sound tape transport means 54, inasmuch as an impulse motion of the visual information tape 51 is required in order to stop motion when movie tape is being transported since during the transportation of the frames of tape 51 rotatable shutter 31 is synchronously arranged therewith in order to meet the requirement of blocking the lens assembly 66 and adjustable iris aperture of assembly 65 so as to avoid flicker and other undesirable optical effects. It is therefore seen that the visual information tape 51, guided by sprockets 43 engaging holes 42 in tape 51, will be transported at a rate four times the rate of transportation of sound tape 41 which is also guided by sprockets 43 engaging holes 42 in tape 41, and that registration of a frame of tape 41 with a corresponding frame of tape 51 is accomplished since only a complete revolution of the universal tape transport drive means 7 can physically transport the sound tape transport means 54 and the visual information tape transport means 55 exactly one frame of tape 41 and a corresponding frame of tape 51, and hence syncronization of sound tape 41 with visual information frame tape 51 is achieved. Endless visual information tape 51 is loaded first by inserting same from the top of case of cartridge 6, arranging tape 51 around the inner edge of the case of cartridge 6, zig-zag of tape is formed and this tape is then pulled past aperature 62, and then tape is engaged with sprockets 43 of flanges 46 and 47 so that sprockets cooperate with holes 42, and then tape is positioned between the surface of separator 91 and the longer side of the case of cartridge 6. The endless upper sound tape 41 is inserted and arranged in a similar manner to that of tape 51, except, that a separator 325 is wedged into the tape storage compartment thereby separating the sound tape 41 from the visual information tape 51 and providing a floor or support base for sound tape 41. An alternate way of structuring the case of cartridge 6 and loading the visual information tape 51, is to provide a removable bottom to case of cartridge 6 similar in structure and mounting means as cover 78, except that depression 79 would not be required in this lower cover. This lower cover would avoid unloading the sound tape when it was necessary to remove the visual information tape for processing and would also facilitate loading of the visual information tape per se. Other features of cartridge 6 is the inclusion of an aperture for admitting gear 11 so that said gear 11 may cooperate with gear 52, and an aperature for admitting gear 10 so that said gear 10 may cooperate with gear 53, as required.

*Dual cartridge with endless tapes.*—Referring to FIGS.

1, 2, 3, and 5, the dual cartridge with endless tapes 300 is comprised of two segments. One segment is cartridge case 35 used for sound information, which contains separator and sound tape backup means similar to means 91, but is half the height of means 91, cover 78 with recessed segment 79 and aperture 80 for retaining the upper end of a shaft approximately one-half the length of shaft 51, the other end of said shaft being held in an aperture in the base of cartridge case 35. Coaxially mounted on the said shaft is sound tape transport means 54 as hereinabove described. Similarly to cartridge 6, guide holes 42 of sound tape 41 cooperate with guide and registration means 43 and the respective flanges upon which said means 43 are spatially equally arranged. The cover 85 of cartridge case 35 is otherwise identical to the cover of case of cartridge 6 as hereinabove described and is mechanically held to case 35 in an identical manner as in the case of cartridge 6. Tape 41 is identical to the sound tape of cartridge 6 and a frame of tape 41 is visible in an aperture 63 of case 35. Sound tape transport gear 11 has access through an aperture in case 35 for cooperative engagement with gear 52 for transporting tape transport means 54 in identical manner as in the case of cartridge 6 hereinabove described. Similarly, cartridge case 84 has separator (not shown) similar to separator 91 but half the height of separator 91. The base of cartridge case 84 has aperture 61 for injection of projection lamp 60 as in cartridge 6. Also as in cartridge 6, visual information tape transport means 55 is retained in case 84, however the visual information tape guide sleeve is coaxial with a shaft one-half the length of the shaft 50 and is secured mechanically in oppositely disposed apertures in the cover and the base of cartridge case 84. Aperture 62 exposes a single frame of visual information tape 51. Cover 86 of cartridge case 84 is secured to case 84 identically the way cover 85 is secured to case 35. Case 35 retains therein a labyrinth 89 which is grooved with grooves 90 generally directed to form a zig-zag or snaking formation, and grooves external the snaking formation; visual information tape 51 is inserted in and guided by these grooves. Such labyrinth and grooves therein guarantees that no portion of tape will cooperate with any other portion. This particular feature enables tape 51 to be processed or developed while said tape is in the cartridge simply by driving the tape transport means 55 with a gear drive injected into an aperture in the side of case 84 to engage with and drive gear 53. Deevloping fluid will circulate freely by virtue of aperture 62 or aperture 61 being open, that is open to free fluid circulation. Tape 51 will in areas other than in labyrinth 90 be located identically as in cartridge 6. Holes 88 in cover 86 will cooperate with locking pins 87, thereby locking cartridge case 35 with cartridge case 84, and externally forming a configuration of identical dimensions and fittings as for cartridge 6, so that cartridge 300 may now be used interchangeably with cartridge 6. Registration and synchronization of the sound and visual information tapes 41 and 51 will be accomplished in an identical manner as hereinabove described for cartridge 6.

*Single cartridge with tape storage and takeup spools.—* Referring to FIGS. 1, 2, 4, 9, and 18, the single cartridge with spring-loaded tape storage and takeup spools 93 is identical externally and almost identical internally to cartridge 6, and fits into still and movie camera-projector apparatus as hereinabove described excepting that the tape storage compartment has spools, spiral springs, and shafts about which the spools are rotated for taking up and storing tapes 41a and 51a, said tapes having ends. Tape 41a performs the identical function to endless tape 41, and tape 51a performs the identical function as endless tape 51. Shafts 96 and 97 are rigidly mechanically affixed into permanently installed separator plate 327 which is mechanically affixed to the case of cartridge 93, the upper and lower ends of shafts 96 and 97 being further supported by depressions on the inner surfaces of the upper and lower covers (not shown) similar to upper and lower covers of cartridge 6 but with the said depressions included. A pair of spiral springs 99 of relatively small diameter of spring wire or small thickness of spring wire are normally spirally wound tightly about shaft 97, the inner ends of springs 97 are embedded in shaft 97 and the outer ends of springs 97 are embedded at the outer periphery of the inner flanges of spools 95. Another pair of relatively large diameter or thickness spiral springs 98, pitched in opposite direction to spiral springs 97, are normally unwound about shaft 98, the inner ends of springs 98 are embedded in shaft 96 and the outer ends of springs 98 are embedded at the outer periphery of the inner flanges of spools 94. Shafts 96 and 97 have each two flanges mechanically affixed to shafts 96 and 97 and cooperating with the inner surfaces of spools 94 and 95, the outer surfaces of the flanges of spools 94 and 95 do not require flanges as the top and bottom covers of cartridge 93 (not shown) will limit the upward or downward travel of spools 94 and 95 during rotation of said spools. Spool pairs 94 and 95 are respectively rotatable about shafts 96 and 97. Tape 41a ends are mechanically affixed at the axes of rotation of the lower spool pair 94 and 95, and tape 51a ends are mechanically affixed at the axes of rotation of the upper spool pair 94 and 95. Springs 98 are pitched in a direction so that said springs wind up during transportation of tapes 41a and 51a, whereas springs 99 are pitched in a direction so that they unwind during transportation of tapes 41a and 51a. Therefore, when cartridge 93 is removed from the still and movie camera-projector apparatus, springs 99 will have been unwound. Inasmuch as the mechanical energy storage in heavy springs 98 are substantially greater than the mechanical energy storage in springs 99, springs 98 will proceed to unwind, thereby restoring storage of tapes 41a and 51a to spools 94, thereby automatically rotating spools 94 in a direction opposite to normal tape transportation direction while unwinding said tapes 41a and 51a from spools 95 since the energy in springs 98 will overcome the effects of the energy of winding up springs 99. Conversely, when cartridge 93 is injected into the still and movie camera-projector apparatus so that gears 52 and 53 cooperate respectively with gears 11 and 10, spools 95 will be wound up prior to the driving of gears 52 and 53 by gears 11 and 10, but upon the driving of gears 52 and 53, tapes 51a and 41a will be transported in the direction indicated in FIG. 9, and spring pair 99 will unwind thereby rotating spool pair 95 in the direction of tape transportation and taking up tapes 51a and 41a on said spool pair 95 inasmuch as springs 99 only have to take up the slack of tapes 51a and 41a by rotating spool pair 95, while spool pair 94 will rotate in the direction of normal tape transport as indicated in FIG. 9, due to pull of tapes 51a and 41a caused by gears 52 and 53 being driven by gears 11 and 10 respectively so that sprocket holes 42 in tapes 51a and 41a are engaged with sprockets 43 firmly guiding and pulling said tapes 51a and 41a. The pull of tapes 51a and 41a due to the driving of said gears 52 and 53 will cause spring pair 98 to be wound up, thereby storing energy in spring pair 98 so that upon manual extraction of cartridge 93 from the still and movie camera-projector apparatus, the energy stored in springs 98 will automatically rotate spool pairs 94 and 95 in a direction opposite to the direction of tapes 41a and 51a transport when said tapes are driven due to the rotation of gears 52 and 53, thereby transferring tapes 41a and 51a from spool pair 95 to spool pair 94, unwinding spool pair 94 and winding spool pair 95. Upon removal by manual means of cartridge 93 from the said apparatus, even when spring pair 99 is tightly wound and spring pair 98 is completely unwound, the energy stored in spring pair 99 will not be adequate to overcome the rigidity and stiffness of spring pair 98, thereby assuring that tapes 41a and 51a will be totally stored on spool pair 94, exclusive of the required leader lead tape portitons between the axis of rotation of spool pair 95 and spool pair 94, until said cartridge 93 is again injected manually into the said apparatus and the said gears 52 and 53 are again driven by external means to said cartridge 93 as hereinabove described.

*Cartridge components as integral portions of the still and movie camera-projector apparatus.*—Referring to FIGS. 1, 2, 3, 4, 5, 9, and 18, the components of cartridge 6 may be integral portions of the basic still and movie camera-projector apparatus and may be mechanically installed therein similar to the installation within the case of cartridge 6. These components are sound and visual information guide sleeve mounting shaft 50 mechanically affixed and held in oppositely disposed recesses of secondary base plate 2 and external enclosure 4, with sound tape transport means 54 and visual information tape transport means 55 coaxially and rotatably mounted with respect to shaft 50, said tape transport means 54 and 55 being circumjacent shaft 50, and gear 52 cooperating with gear 11, and gear 53 cooperating with gear 10, and holes 42 of tape 41 in cooperative engagement with tape guide and registratiton sprockets 43 of sound tape transport means 54, and holes 42 of tape 51 in cooperative engagement with tape guide and registration sprockets 43 of visual information tape transport means 55, and horizontal plate 325 separating the storage compartment of tapes 41 and 51, said tapes 51 and 41 being stored in a manner similar to that of cartridge 6. In this instance, the top of enclosure 4 and the rear of enclosure 4 are individually hinged so that the top and rear may be opened for tape loading and unloading accessibility. Separator and sound tape backup means 91 is mechanically affixed to base plate 2, and an aperture similar to aperture 61 for admitting the projecting lamp 60 is cut out of base plate 2, and separator and sound tape backup means 91 is positioned directly over the said cut out of base plate 2 in substantially the same location as aperture 61 of cartridge 6 when said cartridge 6 is inserted in the said apparatus. A vertical extension plate positioned orthogonally and upward with respect to base plate 2 and mechanically affixed thereto has aperture 62 therein. In this respect, cartridge 6 components have been entirely included within the still and movie camera-projector apparatus, with exception of the case of said cartridge 6.

Additionally, certain components of cartridge 93 not present or part of cartridge 6, may be mechanically installed and become an integral portion of the still and movie camera-projector apparatus when endless tapes are not utilized. These components comprise shafts 96 and 97, spiral spring pairs 98 and 99, tape spool pairs 94 and 95, and separator panel 327 positioned horizontally and in the same plane as separator panel 325 and is in lieu thereof, as integral portions of the still and movie camera-projector apparatus, and in combination with the aforementioned components of cartridge 6, will constitute the components of cartridge 93, and said constituted components will have been totally integrated as part of the said still and movie camera-projector apparatus.

*Structural relationships of sound track record-reproduce assembly.*—Referring to FIGS. 1, 4, 5, 7, 8, 9 and 18, sound track record-reproduce assembly 110 is mechanically affixed in a compartment at the front and left end of either cartridge 6, 300, or 93, within the still and movie camera-projector apparatus, when viewed as injected in the apparatus in FIG. 1. Motor 111 which drives assembly 110 when electrically energized is mechanically affixed to main base plate 1. Synchronizing and timing cam 113, sound track scan drive gear 123, and contoured scan trace follower cam 139 are each mechanically affixed to shaft 112 of motor 111. Synchronizing microswitch 114 is mechanically affixed to main base plate 1 and follower roller 115 mechanically rotatably affixed to the tip of movable contact 116 of microswitch 114, normally cooperates with the high portion of cam 113, while automatic tape transport drive motor activate microswitch 118 is mechanically affixed to main base plate 1, and follower roller 119 mechanically rotatably affixed to movable contact 120 of microswitch 118 normally cooperates with the low portion of cam 113. The lower end of mounting shaft 126 is rotatably supported in a bearing (not shown) affixed to main base plate 1 so that said shaft 126 is always supported in a vertical position and may be rotated about its axis but is mechanically retained in the bearing so as to prevent translation along the axis of shaft 126 rotation. Sound track scan driven gear 124 is mechanically affixed to shaft 126 and the angularly pitched teeth of gear 124 cooperate with the angularly pitched teeth of gear 123. Sound track horizontal drive cam 127 is mechanically affixed to shaft 126. Said cam 127 has mechanically affixed in the side or surface of cam 127 drive and follower pin 128, near the outer periphery of said cam 127, said pin 128 is inserted in and cooperates with guide slot 131 of record-reproduce head mounting and horizontal motion bracket 129 which is pivotally mounted by means of pivot and retention pin 133, said pin 133 being mechanically affixed to vertical motion record-reproduce head member 132. Member 132 has two guide bars 136 with guide bar flanges 137 as integral portions thereof, said flanges cooperating with the undersurface of a lip in member 132 and compressible springs 138 through which guide bars 136 are inserted so that during upward vertical motion of member 132 as indicated by arrow 213, said springs 138 are compressed. The lower end of member 213 has another lip through which guide bars 136 extend, the lower end of compressible springs 138 cooperating with the upper surface of the lower lip of member 132. Guide bars 136 are embedded and mechanically held by base mounting bracket 134 for member 132, base mounting bracket 134 being mechanically affixed to main base plate 1. Follower roller 135 of vertical motion member 132 is rotatably mechanically affixed to member 132 and cooperates with the contoured edge or profile of cam 139. Record-reproduce head 130 is mechanically affixed to the upper end of bracket 129. Cam 139 is shaped so that there are four elevations for the 360 degrees of cam contoured profile, each elevation being progressively higher than the former elevation, with steep transitions or steps between each elevation. Normally, prior to the said assembly 110 being energized, follower roller 135 is positioned at the beginning of the lowest elevation of cam 139. When motor 111 is electrically energized, shaft 112 and consequently cam 113, gear 123, and cam 139 is automatically rotated clockwise while gear 124 coupled at a 90 degree angle to gear 123 is rotated clockwise; when FIG. 1 is viewed from the top gear 124 appears therein to be a clockwise rotation, and cam 127 appears therein to be a clockwise rotation, thereby moving pin 128 reciprocally in slot 131, from the center of slot 131 to one end of said slot 131 the back to the center and thence to the other end of slot 131 and thence to the center of slot 131, thereby causing arc shaped horizontal motion of the upper end of bracket 129 in the direction of arrow 214. Starting from the initial position of the point of cooperation between head 130 and the surface of a frame of the record-reproduce sound tape as accessible in aperture 63 of the particular cartridge retaining said sound tape, and as cam 139 is automatically rotated so that the first elevation of cam 139 cooperates with follower roller 135 over the length of said first surface, head 130 is translated from the initial start location for one cam trace from the extreme right to the extreme left of said scan trace, and follower roller 135 follows the first rise of the cam 139 profile to the second surface of the cam 139 profile thereby translating head 130 upward to the left end of the second trace, and follower roller 135 is automatically rotated along the second elevation surface of the cam 139 thereby translating head 130 along the second trace from the extreme left to the extreme right, and at this point follower roller 135 follows the second rise of the cam 139 profile to reach the third elevation surface of cam 139 whereupon head 130 is translated upward to the third trace at the extreme right, and follower roller 135 cooperating with the third elevation surface of cam 139 will be translated from the extreme right to the extreme left and follower roller 135 will be positioned at the third rise of cam 139, whereupon head 130 will be translated upward to the fourth trace on the said sound tape, and follower roller now being positioned at the fourth elevation surface of cam 139 will due to cooperation of said follower roller 135 with cam 139 follow the said fourth elevation surface, and head 130 will be translated at the topmost portion of the scan trace on the sound tape from the extreme left to the extreme right. Upon reaching the end of the fourth trace, corresponding to the fourth or highest elevation surface of cam 139, the last or highest rise in cam 139 will have been reached by cooperation of follower roller 135 with said highest rise. However, since the next elevation surface is the first elevation surface, follower roller 135 will have to drop to reach cooperative contact with said first elevation surface at the initial start location point, whereupon motor 111 will be automatically suddenly stopped due to the action of the combination synchronizing cam 113 and microswitch 114 and the built-in brake internal motor 111. During the upward motion of member 132, member 129 was carried upward as it was being moved generally horizontally by rotational action of cam 127 driving pin 128 in slot 131 of member 129, and pivoting member 129 simultaneously about pivot pin 133. Compressed springs 138 automatically returns member 132 after completion of rotation of the fourth elevation surface of cam 139 as said member 132 having automatically risen upward along guide bars 136 are now returned due to spring action of springs 138 to the lowest position of member 132 slideably along guide bars 136 so that the lower lip surface of member 132 cooperates with base mounting bracket 134 when follower roller 135 is cooperatively dropped along the last and highest rise of cam 139 to come to rest on first elevation surface at the initial start location point.

*Structural relationships of still and movie camera-projector utilizing flux responsive record-reproduce means.*—Referring to FIGS. 1, 4, 5, 9, 17, and 18, flux responsive record-reproduce means may be substituted in place of assembly 110 as hereinabove described. The conventional flux rate of change head 130 imposes requirements of relatively fast speeds of head with respect to tape as compared to the flux responsive head 232, where substantially slower speeds will achieve the same frequency response as compared to the flux rate of change head 130 at higher speeds. For short messages, therefore, the mechanical complexity of assembly 110 can be avoided by using head 232 and automatically moving tape 51 relative head 232. The difference between the two methods of recording and reproducing sound is known in the art and therefore does not merit lengthy discussion herein. Structurally, head 232 may be mechanically affixed to the upper end of a single bracket (not shown), the lower end of said single bracket mechanically affixed to main base plate 1, and the gap of head 232 cooperates with the surface of the sound tape in aperture 63. Inasmuch as scanning of a stationary frame of the sound tape to produce sound track 92 will not be required when the stationary head 232 is utilized, constant motion of sound tape transport means 54 driven by motor 15 during recording and reproduction of sound will be required; this is to establish relative motion of tape to head. The recording or reproduction of sound will be hereinafter described in conjunction with the description of FIG. 17, the electrical schematic, for the invention when flux responsive means is utilized.

Figure 8:
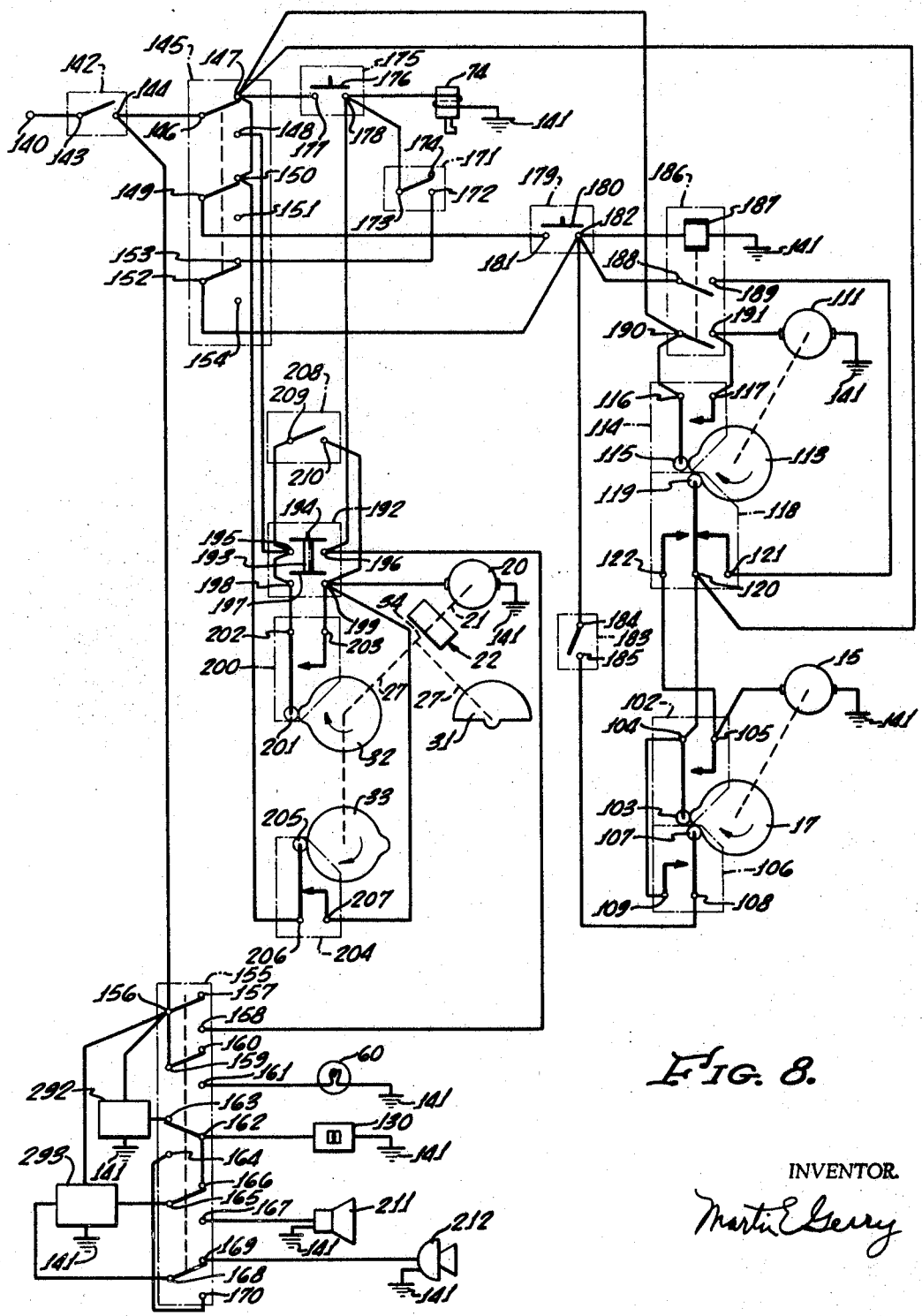
FIG. 8 is an electrical schematic of the control and record-reproduce circuits of this invention.

*Electrical relationships of still and movie camera-projector apparatus.*—Referring to FIGS. 1, 2, 3, 4, 5, 6, 7, 8, 9, 17, and 18, but with particular emphasis on FIG. 8, the electrical schematic shows the components of the still and movie camera-projector apparatus in the normally power-off mode. Power input means 140 is electrically connected by means of wire to movable contact 143 of switch 142. Common power and signal return means 141 is electrically connected by means of wire to return of still shutter activate solenoid 74, return of relay coil 187, return of motor 111, return of motor 20, return of motor 15, return of projection lamp 60, return of record-reproduce head 130, return of loud speaker 211, return of microphones 212 (only one microphone shown, but microphones are in parallel), return of exciter oscillator 292, and return of record-reproduce amplifier 293. Stationary contact 144 of switch 142 is electrically connected by means of wire to movable contact 146 of still-movie selector switch 145 and to movable contact 156 of record-reproduce and camera-project switch 155 and to movable contact 159 of switch 155 and to exciter oscillator 292 and to record-reproduce amplifier 293. Stationary contact 147 is electrically connected by means of wire to stationary contact 148 of still shutter trigger push button 175 and to stationary contact 150 of switch 145 to movable contact 206 of movie shutter open positioning microswitch 204 and to movable contact 120 of automatic tape transport drive motor activate microswitch 118 and to movable contact 104 of still frames advance motor synchronizing microswitch 102 and to stationary contact 109 of automatic sequencing still visual information frames and sound tracks microswitch 106. Stationary contact 148 of switch 145 is electrically connected by means of wire to stationary contact 195 of movie camera control push button 192 and to movable contact 209 of movie projector control switch 208 and to stationary contact 198 of push button 192 and to movable contact 202 of movie frames advance motor synchronizing microswitch 200. Stationary contact 178 of push button 175 is electrically connected by means of wire to the input terminal of still shutter activate solenoid 74 and to movable contact 173 of automatic-manual sound track record selector switch 171 and to stationary contact 196 of push button 192 and to stationary contact 158 of switch 155. Movable contact 149 of switch 145 is electrically connected by means of wire to stationary contact 181 of sound track scan control push button 179. Movable contact 152 of switch 145 is electrically connected by means of wire to stationary contact 182 of push button 179 and to movable contact 184 of automatic sequence reproduce and cycle still visual information frames and sound tracks switch 183 and to input terminal of coil 187 of sound track scan control relay 186 and to movable contact 188 of relay 186. Stationary contact 189 of relay 186 is electrically connected by means of wire to normally closed stationary contact 121 of microswitch 118. Stationary contact 191 of relay 186 is electrically connected by means of wire to input terminal of motor 111 and to stationary contact 117 of microswitch 114. Normally open stationary contact 122 of microswitch 118 is electrically connected by means of wire to stationary contact 105 of microswitch 102 and to input terminal of motor 15. Movable contact 108 of microswitch 106 is electrically connected by means of wire to stationary contact 185 of switch 183. Stationary contact 153 of switch 145 is electrically connected by means of wire to stationary contact 172 of switch 171. Stationary contact 147 of switch 145 is electrically connected by means of wire to movable contact 190 of relay 186. Movable contact 190 of relay 186 is electrically connected by means of wire to movable contact 116 of synchronizing microswitch 114. Stationary contact 210 of switch 208 is electrically connected by means of wire to stationary contact 199 of push button 192 and to input terminal of motor 20 and to stationary contact 207 of microswitch 204 and to stationary contact 203 of microswitch 200. Stationary contact 161 of switch 155 is electrically connected by means of wire to input terminal of projection lamp 60. Output of exciter oscillator 292 is electrically connected by means of wire to stationary contact 163 of switch 155. Input terminal of record-reproduce amplifier 293 is electrically connected by means of wire to movable contact 168 of switch 155. Stationary contact 164 of switch 155 is electrically connected by means of wire to stationary contact 170 of switch 155. Stationary contact 164 of switch 155 is electrically connected by means of wire to stationary contact 170 of switch 155. Output terminal of amplifier 293 is electrically connected by means of wire to movable contact 165 of switch 155. Movable contact 162 is electrically connected by means of wire to stationary contect 166 of switch 155 and to input terminal of flux rate of change record-reproduce head 130. Stationary contact 167 of switch 155 is electrically connected by means of wire to input terminal of loud speaker 211. Stationary contact 169 of switch 155 is electrically connected by means of wire to input terminals of microphone pair 212 (only one microphone is shown, but two microphones are used connected in parallel). It should be pointed out that record-reproduce head 130 generally may have one winding and that exciter oscillator, which may have a frequency ranging between 50 and 120 kilocycles per second, but the particular frequency chosen is fixed, is electrically connected in the record mode in parallel with the output of the record-reproduce amplifier 293. Push button 194 is a double contactor push button operating two circuits and hence has an electrical insulating member 193 mechanically affixed between the two contactors 194 and 197. In the still mode of operation and after power is applied by manually operating switch 142 and causing cooperation of contacts 143 and 144, electrical power will be applied through normally cooperating contacts 206 and 207 to motor 20 thus energizing motor 20, thereby rotating output shaft 21, operating frame rate control mechanism 22, and rotating movie shutter 31 and shaft 27 and cams 32 and 33 in a clockwise direction. A 180 degree rotation of movie shutter 31 will result and will remove blockage of light from lens and adjustable iris so that exposure of film will be dependent only upon the speed of the still shutter and the aperture of the iris, and follower roller 205 following the contour of cam 33 will when cam 33 has completed 180 degrees of rotation cause cooperation of the high portion of cam 33 and roller 205 thereby causing contact pair 206 and 207 to cease cooperating and thereby removing power from motor 20, causing motor 20 to be automatically stopped and physically stopped instantly due to loss of power thereto and the internal built-in brake action within said motor 20. FIG. 8 normally shows cams 32 and 33, and shutter 31 in the movie mode but shows switch 145 in the still mode. Consequently to maintain the configuration in the movie mode, switch 145 would have to be manually operated prior to the operation of power switch 142. The camera-projector or record-reproduce mode switch 155 may be operated at any time either when in the still or in the movie mode without regard to the sequence of operation of switches 145 and 142.

Figure 17:
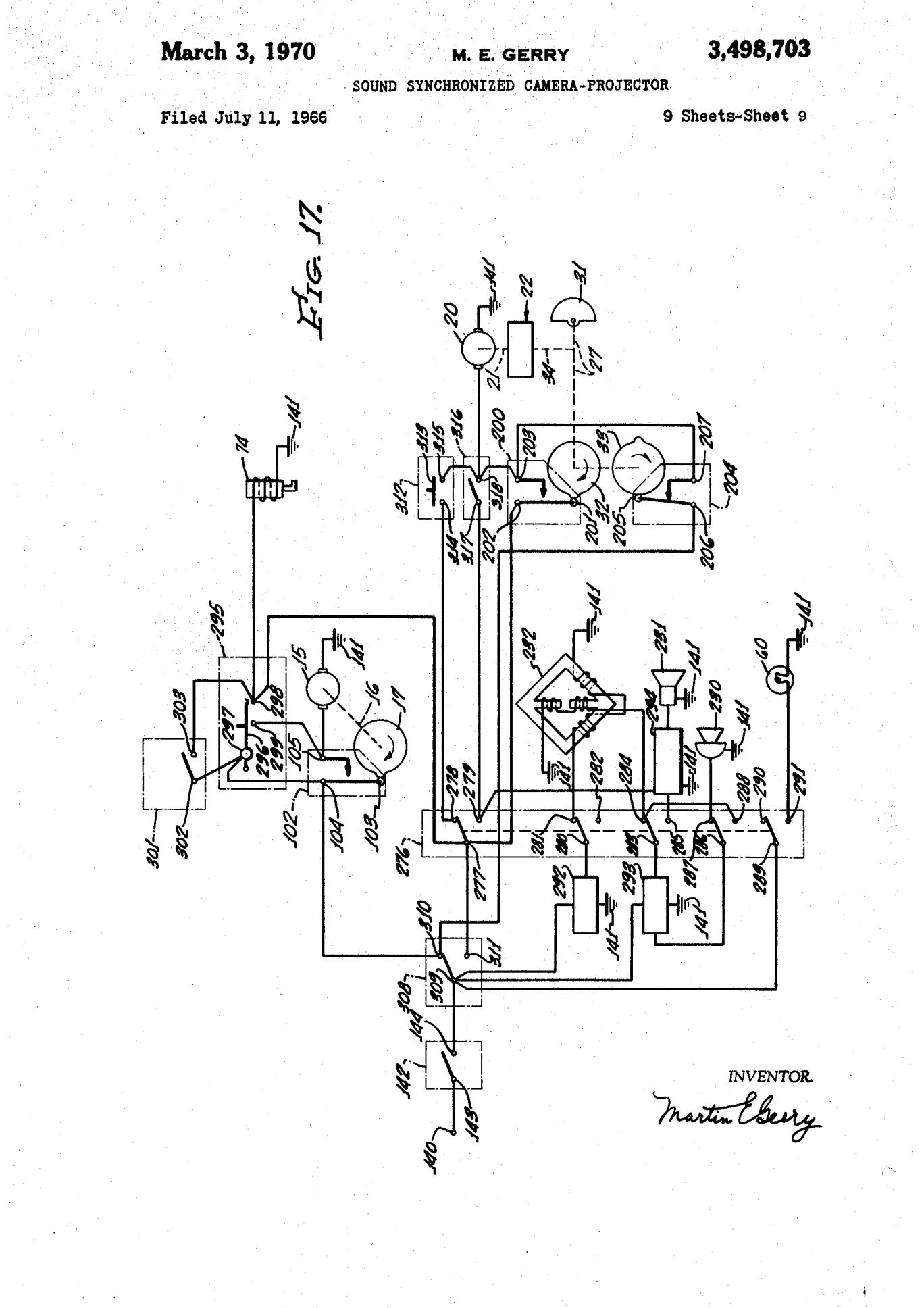

With particular emphasis on FIG. 17, where the flux responsive record-reproduce head 232 is used in lieu of the flux rate of change head 130, the entire sound track record-reproduce assembly 110 is deleted and as hereinabove described the flux responsive head 232 and a mounting bracket is substituted therefor. The identical quantity of sound information will now be recorded or reproduced by head 232 on a single line of sound track 92 by cooperative engagement of the gap of head 232 with the surface of magnetic tape which now is required to move with respect to head 232 substantially slower than the rate of motion of head 130 of assembly 110. Head 232 is comprised of two windings, an exciter winding wound on two arms of a magnetic bridge of the magnetic core of said head 232 and a pair of signal windings wound across the members of the magnetic bridge comprising the air gap. The electrical schematic of FIG. 17 shows the still and movie camera-projector apparatus in the power-off mode. The flux responsive record-reproduce means therefore will afford some mechanical simplification as compared the flux rate of change record-reproduce means but functionally will remain the same. Power input means 140 is electrically connected by means of wire to movable contact 143 of power control switch 142. Common power and signal return means 141 is electrically connected by means of wire to the return side of still shutter activate solenoid 74 and the return side of motor 15 and the return side of motor 20 and to the return side of signal and exciter oscillator windings of the flux responsive record-reproduce head 232 and to the return side of loud speaker 231 which substitutes for loud speaker 211 in FIG. 8, and to the return side of microphone pair 230 which substitutes for microphone pair 212 in FIG. 8, and to the return side of projection lamp 60, and to the return side of exciter oscillator 292 and to the return side of record-reproduce amplifier 293 and to the return side of demodulator 294. Stationary contact 144 of switch 142 is electrically connected by means of wire to movable contact 309 of still-movie selector switch 308. Movable contact 309 of switch 308 is electrically connected by means of wire to exciter oscillator 292 and to record-reproduce amplifier 293 and to movable contact 289 of camera project and record-reproduce switch 276. Stationary contact 310 of switch 308 is electrically connected to movable contact 104 of still frames advance motor synchronizing microswitch 102 and to movable contact 206 of movie shutter open positioning microswitch 204. Stationary contact 311 of switch 308 is electrically connected by means of wire to movable contact 277 of switch 276. Movable contact 277 of switch 276 is electrically connected by means of wire to stationary contact 298 of make before break push button 295. Stationary contact 298 of push button 295 is electrically connected by means of wire to input terminal of still shutter activate solenoid 74 and to stationary contact 303 of project mode solenoid activate toggle switch 301. Stationary contact 104 of microswitch 102 is electrically connected by means of wire to stationary contact 297 of push button 295. Stationary contact 297 of push button 295 normally cooperates with movable contact 296 and is also electrically connected by means of wire to movable contact 302 of switch 301. Stationary contact 299 of push button 295 is electrically connected by means of wire to stationary contact 105 of microswitch 102. Stationary contact 105 of microswitch 102 is electrically connected by means of wire to input terminal of motor 15. Stationary contact 278 of switch 276 is electrically connected by means of wire to stationary contact 314 of movie camera mode push button 312. Stationary contact 279 is electrically connected by means of wire to movable contact 317 of movie mode projector toggle switch 316 and to demodulator 294 to supply power thereto in the projector mode. Output terminal of exciter oscillator 292 is electrically connected by means of wire to movable contact 280 of switch 276. Stationary contact 281 of switch 276 is electrically connected by means of wire to the input of exciter oscillator windings of flux responsive record-reproduce head 232. Output terminal of record-reproduce amplifier 293 is electrically connected by means of wire to movable contact 283 of switch 276. Stationary contact 284 of switch 276 is electrically connected by means of wire to input of signal windings of flux responsive record-reproduce head 232 and to stationary contact 288 of switch 276. Stationary contact 285 of switch 276 is electrically connected to the input of demodulator 294 and output of demodulator 294 is electrically connected by means of wire to the input terminal of loud speaker 231. Movable contact 286 of switch 276 is electrically connected by means of wire to the input of record-reproduce amplifier 293. Stationary contact 287 of switch 276 is electrically connected by means of wire to the input of microphone pair 230 (only one microphone is shown in FIG. 17). Stationary contact 291 of switch 276 is electrically connected by means of wire to input terminal of projection lamp 60. Stationary contact 315 of push button 312 is electrically connected by means of wire to stationary contact 318 of switch 316. Stationary contact 318 is electrically connected by means of wire to the input terminal of motor 20 and to stationary contact 203 of movie frames advance motor synchronizing microswitch 200. Movable contact 277 of switch 276 is electrically connected by means of wire to movable contact 202 of microswitch 200. Stationary contact 203 of microswitch 200 is electrically connected by means of wire to stationary contact 207 of microswitch 204. It should be noted switch 276 is similar in overall function to switch 155, that switch 308 is generally similar in function to switch 145, that loud speaker 231 performs a similar function to loud speaker 211, and that microphone pair 212 performs a similar function to microphone pair 230. Make before break push button 295 has special features in that upon manually depressing said push button 295, movable contactor 296 traveling from its cooperative relationship with stationary contact 297 will pivot at one end about a pivot point and will disconnect power from contactor 296 by causing contactor 296 to cease cooperating with contact 297 only after electrical contact and cooperation had been established with stationary contacts 298 and 299, and causing momentary power application from movable contactor 296 to stationary contacts 298 and 299 prior to ceasing cooperation between said contactor 296 and said stationary contact 297. However, cooperative relationship between contactor 296 and stationary contact 298 will be establish prior to the cooperative relationship of said contactor 296 with stationary contact 299 due to the fact that the portion of contactor 296 cooperating with contact 298 is curved and hence is closer in proximity normally to said contact 298, thereby assuring that still shutter activate solenoid 74 will be energized and hence still shutter will be operated prior to the energizing and operation of motor 15. In the power-off mode the electrical relationships of the said apparatus with flux responsive record-reproduce head is as schematically shown in FIG. 17. However, when power is applied by manually operating switch 142 so that contacts 143 and 144 cooperate, and in the still mode of operation, switch 308 is as schematically shown in FIG. 17, and contacts 309 and 310 cooperate with each other thereby applying power through cooperating contact pair 206 and 207 to input of motor 20, causing motor 20 to be energized and to rotate shaft 21 which rotates frame rate control mechanism 22, output shaft 34, and movie shutter shaft 27 upon which is mechanically affixed cams 32 and 33 thereby rotating cams 32 and 33, and when cam 33 is rotated 180 degrees so that the high portion of said cam 33 cooperates with follower roller 205 thereby causing contact pair 206 and 207 to cease cooperating with each other and automatically deenergizes motor 20 and instantaneously due to internal brake within motor 20 stops rotation of shaft 21, frame rate control mechanism 22, shaft 27 and cams 32 and 33 and movie shutter 31. Rotatable movie shutter 31 will have rotated 180 degrees, being on the same shaft 27 and will thereby unblock or expose lens assembly 66 and aperture of adjustable iris so that the only shutter controlling light transference is the still shutter. FIG. 17 normally shows cams 32 and 33 and shutter 31 in the movie mode but shows switch 308 in the still mode. Consequently, when it is desired to maintain the apparatus in the movie mode configuration, switch 308 would have to be manually operated prior to the operation of power switch 142. The camera-projector or record-reproduce mode switch 276 may be operated at any time either when in the still or in the movie mode without regard to the sequence of operation of switch 308 and switch 142.

*Operational relationships in still camera mode.*—Referring to FIGS. 1, 2, 3, 4, 5, 6, 7, 8, 9, 10, 11, 17, and 18, but particularly to FIG. 8, which is the schematic diagram where flux rate of change head 130 is utilized, power is applied by manually operating switch 142 causing cooperation of contacts 143 and 144. Power is instantly applied through cooperating contact pair 146 and 147 and through cooperating contacts 206 and 207 to motor 20, energizing motor 20 and rotating cams 32 and 33 and shutter 31 driven by motor 20 in combination with frame rate control mechanism 22, its output shaft 34, and shaft 27, so that when cam 33 is automatically rotated 180 degrees from its start location, the high portion of cam 33 will cooperate with follower roller 205 thereby moving contact 206 away from contact 207 and causing the ceasing of cooperation of said contacts 206 and 207, thereby removing power from motor 20 and due to the internal brake of said motor 20, motor 20 stops instantly without overtravel so that after 180 degrees of rotation of cam 33, the high portion of cam 33 cooperates with follower roller 205. This action also causes rotation of prime mover mechanism 37, as hereinabove described, which automatically drives universal tape transport drive means 7, 180 degrees counterclockwise. At this time any of the desired cartridges, namely cartridge 6 or cartridge 300 or cartridge 93 is manually injected into the still and movie camera-projector apparatus. Elements of switch 155 are positioned as shown in FIG. 8, namely contact 156 cooperating with contact 157 to which no circuitry is connected, contact 159 cooperating with contact 160 to which no circuitry is connected, contact 162 cooperating with contact 163 thereby connecting exciter oscillator 292 to head 130, contact 165 cooperating with contact 166 thereby connecting the output of the record-reproduce amplifier 293 to head 130, and contact 168 cooperating with contact 169 thereby connecting electrically microphone pair 212 (only one microphone is shown) to the input terminal of record-reproduce amplifier 293. Switch 145 is in position as shown in FIG. 8, namely contact 146 cooperating with contact 147 thereby applying power to contact 177 of push button 175 and to contact 150 of switch 145 and to contact 120 which cooperates with contact 121 of microswitch 118 and to contact 104 of microswitch 102 and to contact 109 of microswitch 106. Contact 149 cooperates with contact 150 thereby applying power to contact 181 of push button 179, and contacts 152 and 153 cooperate with each other thereby electrically connecting contact 172 of switch 171 with contact 182 of push button 180 and with contact 188 and with input to relay coil 187 of relay 186 and with contact 184 of switch 183. Meanwhile, power is applied from contact 147 of switch 145 to contact 190 of relay 186 and to contact 116 of microswitch 114. When push button 175 is manually depressed so that contactor 176 cooperates with contacts 177 and 178, still shutter activate solenoid 74 is electrically energized which operates the triggering mechanism of the still shutter thereby photographing a still image through lens 66 and open iris controlled by adjust ring 72 and through the mechanical still shutter which had been preset to the desired speed by manually adjusting ring 71 or automatically by presetting the proper ASA film speed, the shutter speed setting and iris aperture combination being automatically controlled by the electronics in the same compartment as the range and view finder and light sensing photocell. The still object having been photographed on the film or tape 51, push button 179 is manually operated thereby causing cooperation of contactor 180 with contacts 181 and 182 which will energize the relay 186 by momentarily applying power to relay coil 187. Contacts 188 and 190 will be simultaneously pulled in by the energized relay coil 187 causing cooperation between contacts 188 and 189 thereby holding said relay coil 187 and through normally cooperating contacts 120 and 121 of microswitch 118. Motor 111 will be energized due to cooperating contacts 190 and 191 causing rotation of motor 111 armature and cam 113. Upon slight rotation of cam 113 prior to ceasing of cooperation of contactor 180 with contacts 181 and 182, cam 113 will maintain power to motor 111 by virtue of cooperation of contacts 116 and 117 when follower roller 115 moves to the low portion of cam 113 and by contacts 190 and 191 energized from contact 147 of switch 145, until 360 degrees of cam 113 rotation has been completed at which time motor 111 will be deenergized and the built in brake will cause said motor 111 to instantly stop when electrical power is removed. However, during 360 degrees of rotation of cam 113, sound track record-reproduce assembly 110 will be automatically operated producing sound track 92 in the manner hereinabove described. Approximately three degrees prior to cam 113 completing its 360 degree revolution, the high portion of cam 113 will cooperate with follower roller 119, which had been following cam 113 profile, and will cause the momentary ceasing of cooperation between contacts 120 and 121 thereby momentarily removing power from holding contact pair 188 and 189 and relay coil 187, thereby causing contact pair 188 and 189 to cease cooperating and causing contact pair 190 and 191 to cease cooperating, but until the total 360 degrees of cam 113 rotation is complete, motor 111 will nevertheless have power applied thereto through cooperating contact pair 116 and 117 energized by power delivered from contact 147 of switch 145. Simultaneously with the cooperation of the high portion of cam 113 with follower roller 119, power will be transferred momentarily from movable contact 120 to stationary contact 122 of microswitch 118 so that power is thereby momentarily applied to contact 105 of microswitch 102 and to motor 15. Motor 15 being one of the prime mover components will drive shaft 16 and cam 17 clockwise thereby causing cooperation of contact 104 with contact 105 because follower roller 103 cooperating with cam 17 will move off the high portion of cam 17 to the low portion of cam 17 thereby causing cooperation of contacts 104 and 105 and thereby maintaining power to motor 15 until 360 degrees of cam 17 rotation has been completed and the high portion of cam 17 is returned to cooerative relationship with follower roller 103 thereby deenergizing and stopping motor 15. In this mode of operation, switch 183 is not manually operated. This mode of operation described individual manual operation of push buttons 175 and 179 in sequence so that the operator may take adequate time to record a sound track after taking the photographic image related thereto as above described. However, the photographic image which is being photographed may in itself emit sound which is desired to be captured and in this instance immediate sequencing of the operation of photographing the image and recording of sound is desired. It is therefore required that the recording action of sound be initiated by manually depressing push button 175 without having to manually depress push button 179. This is accomplished by manually operating switch 171 so that contact pair 173 and 172 cooperate with each other thereby automatically applying power to relay coil 187 and to contact 188 through cooperating contact pair 173 and 172 in series with contact pair 153 and 152 when push button 175 is manually operated which will cause cooperation of contactor 176 with contacts 177 and 178 supplying power from contact 147 of switch 145 connected to contact 177. It should also be remembered that motor 15 is part of prime mover 37 for driving the universal tape transport drive means 7 as hereinabove described and therefore at the completion of 360 degrees of cam 17 rotation corresponding with a single revolution of shaft 16 of motor 15, exactly one frame of sound tape 41 and visual information tape 51 will have been simultaneously transported in accordance with the operation of prime mover 37 and universal tape transport drive means 7 and simultaneous idling of gear 24 of movie prime mover portion of prime mover 37 due to free wheeling action of clutch 23 together with the transportation of the sound and visual information tape transport means 54 and 55 as hereinabove described in this specification.

Referring particularly to FIG. 17, the operational relationship in the still camera mode where the flux responsive head 232 is utilized, power is applied by manually operating switch 142 causing cooperation of contacts 143 and 144. Power is instantly applied through cooperating contact pair 309 and 310, thereby applying power to contact 104 of microswitch 102 and to contact 297 of push button 295 and to contact 302 of switch 301, and through cooperating contact pair 206 and 207 to motor 20, energizing motor 20 and rotating cams 32 and 33 and shutter 31 driven by motor 20 in combination with frame rate control mechanism 22, its output shaft 34, and shaft 27 so that when cam 33 is automatically rotated 180 degrees from its start location, the high portion of cam 33 will cooperate with follower roller 205 thereby moving contact 206 away from contact 207 and causing the ceasing of cooperation of said contacts 206 and 207, thereby removing power from motor 20 and due to the internal brake of said motor 20, motor 20 stops instantly without overtravel so that after 180 degrees of rotation of cam 33, the high portion of cam 33 cooperates with follower roller 205. This action also caused rotation of prime mover mechanism 37 as hereinabove described which automatically drives universal tape transport drive means 7, 180 degrees counterclockwise. At this time any of the desired cartridges, namely cartridge 6 or cartridge 300 or cartridge 93 is manually injected into the still and movie camera-projector apparatus. Elements of switch 276 are as shown in FIG. 17, namely contact 277 cooperating with contact 278 enabling power to be applied to contact 314 of push button 312, contact 280 cooperating with contact 281 thereby electrically connecting output of exciter oscillator 292 to exciter windings of flux responsive head 232, contact 283 cooperating with contact 284 thereby electrically connecting output of record-reproduce amplifier 293 to signal windings of flux responsive had 232, contact 286 cooperating with contact 287 thereby electrically connecting microphone pair 230 (only one microphone is shown) to input of record-reproduce amplifier 293, and contact 290 cooperating with contact 289 wherein no circuitry is involved. When push button 295 is manually depressed so that contactor 296 cooperates with contacts 298 and 299 and subsequently momentarily thereafter causes contactor 296 to cease cooperation with contact 297, since push button 295 is a make before break push button, and remembering that the end of contact 296 is curved so that it is physically closer to contact 298 than it is to contact 299, so then contact 296 cooperates with contact 298 momentarily prior to contactor 296 cooperating with contact 299 and contactor 296 not yet having ceased cooperation with contact 296, power will first be applied to still shutter activate solenoid 74 thereby operating still camera shutter at the specific preset speed and momentarily thereafter power is applied to contact 299 thereby energizing motor 15. At this time contactor 296 will have ceased cooperation with contact 297 thereby removing power momentarily until motor 15 has had opportunity to rotate its output shaft 16 and cam 17 several degrees thereby causing follower roller 103 to be positioned on the low portion of said cam 17 which causes contacts 104 and 105 to cooperate with each other thereby maintaining power to motor 15 until 360 degrees of cam 17 rotation has been completed, whereupon contacts 104 and 105 will cease to cooperate with each other and motor 15 will be deenergized. The built in brake in motor 15 will automatically and instantaneously stop motor 15 when power is removed therefrom. It should also be remembered that motor 15 is part of prime mover 37 for driving the universal tape transport drive means 7 as hereinabove described and therefore at the completion of 360 degrees of cam 17 rotation, corresponding with a single rotation of shaft 16 of motor 15 exactly one frame of sound tape and visual information tape will have been simultaneously transported in accordance with the operation of prime mover 37 and universal tape transport drive means 7 and simultaneously idling of gear 24 of movie prime mover portion due to free wheeling action of clutch 23 together with the transportation of the sound and visual information tape transport means 54 and 55 as formerly hereinabove described. The sound tape and visual information tape will be transported during rotation of cam 17, the sound tape being transported smoothly during recording of sound. Duration of recording will occur during 180 degrees of cam 17 rotation, inasmuch as prior to rotation of cam 17, universal tape transport means 7 having been rotated 180 degrees automatically will have rotated partial gear 10, 180 degrees, so that 180 degrees of universal tape transport means 7 rotation will remain prior to cooperative engagement with gear 53 of visual information tape transport means 55. Likewise only 180 degrees of gear 11 and hence gear 52 rotation will remain thereby allowing for only one half a track corresponding to one half a frame width of sound frame 41. Therefore, inasmuch as it is desired to record prior to the time when the next-in-sequence photographic image is impinged on the visual information, 90 degree of means 7 being unusable due to the fact that it directly proceds the 90 degrees allocated to the gearing of partial gear 10, so that the last 180 degrees of transport of sound tape transport means and the corresponding frame of sound tape may be preferably excluded, unless there is no objection to listening to the recording of sound for a given period of time after the visual information frame pertinent thereto had already been viewed, in which case the full frame width of sound track will be available thereby doubling the recording time.

*Operational relationships in still projector mode.*— Referring to FIGS. 1, 2, 3, 4, 5, 7, 8, 9, 10, 11, 17, and 18, and particularly to FIG. 8, the schematic in which the flux rate of change head 130 is utilized, power is applied by manually operating switch 142 causing cooperation of contacts 143 and 144. Switch 145 is in the mode as shown in FIG. 8, so that when power is applied through cooperating contact pair 146 and 147 and through cooperating contacts 206 and 207 to motor 20, energizing motor 20 and automatically rotating cams 32 and 33 and shutter 31, driven by motor 20 in combination with frame rate control mechanism 22, its output shaft 34, and shaft 27, so that when cam 33 is automatically rotated 180 degrees from its start location, the high portion of cam 33 will cooperate with follower roller 205 thereby moving contact 206 away from contact 207 and causing the ceasing of cooperation of said contacts 206 and 207, thereby removing power from motor 20 and due to the internal brake of said motor 20, motor 20 stops instantly without overtravel so that after 180 degrees of rotation of cam 33, the high portion of cam 33 cooperates with follower roller 205. This action also causes rotation of prime mover mechanism 37, as hereinabove described, which automatically drives universal tape transport drive means 7, 180 degrees counterclockwise. At this time any of the desired cartridges, namely cartridge 6 or cartridge 300 or cartridge 93 is manually injected into the still and movie camera-projector apparatus. Elements of switch 155 are in opposite mode to that shown in FIG. 8, namely contact 156 cooperating with contact 158 thereby providing power to still shutter activate solenoid 74, contact 159 cooperating with contact 161 thereby providing power to projection lamp 60 thereby energizing and illuminating said lamp 60 for projection of images from visual information frames of tape 51, contact 162 cooperating with contact 164 and contact 168 cooperating with contact 170 thereby electrically connecting flux rate of change record-reproduce head 130 to input of amplifier 293, and contact 165 cooperating with contact 167 thereby electrically connecting loud speaker 211 to output of amplifier 293. Switch 145 is positioned in the mode as shown in FIG. 8, and this mode is exactly as above described in "Operational Relationships in Still Camera Mode." Push button 175 is not utilized and switch 171 is in position so that contact 173 cooperates with contact 174 (open circuited), and push button 179 is manually operated so that contactor 180 cooperates with contacts 181 and 182 thereby providing power to relay coil 187 of relay 186. The operating characteristics are identical thereafter as described in "Operational Relationships in Still Camera Mode" except that if it is desired to cycle the next-in-sequence visual information frames and corresponding sound tracks automatically, switch 183 will be manually operated after the initial manual operation of push button 179, so that contacts 184 and 185 cooperate with each other, then three degrees prior to completion of 360 degrees of cam 17 rotation, contacts 108 and 109 will momentarily cooperate with each other due to cooperation of the high portion of cam 17 with follower roller 107 thereby applying power to cooperating contacts 184 and 185 and hence to relay coil 187 for repetition of the next-in-sequence sound track in the same manner the prior sound track was reproduced, and upon completion of 360 degrees rotation of cam 17, the high portion of cam 17 will cooperate with follower roller 103 thereby causing contacts 104 and 105 to cease cooperating with each other, deenergizing motor 15 and cause said motor 15 to stop instantaneously due to the internal brake therein and thereby avoid motor 15 overtravel with respect to the cooperative relationship of the high portion of cam 17 and follower roller 103. Referring particularly to FIG. 17, where flux responsive record-reproduce head 232 is utilized in lieu of flux rate of change head 130, the operational relationship in the still projector mode may now be described. Power is applied by manually operating switch 142 causing cooperation of contacts 143 and 144. Power is instantly applied through cooperating contacts 309 and 310 thereby applying power to contact 104 of microswitch 102 to contact 297 of push button 295 and to contact 302 of project mode solenoid activate toggle switch 301, and through cooperating contact pair 206 and 207 to contact 203 of microswitch 200, and to contact 318 of switch 316 and to contact 315 of push button 312 and to motor 20, energizing motor 20 and rotating cams 32 and 33 and shutter 31 driven by motor 20 in combination with frame rate control mechanism 22, its output shaft 34, and shaft 27, so that when cam 33 is automatically rotated 180 degrees from its start location, the high portion of cam 33 will cooperate with follower roller 205 thereby moving contact 206 away from contact 207 and causing the ceasing of cooperation of said contacts 206 and 207, thereby removing power from motor 20 and due to the internal brake of said motor 20, motor 20 stops instantly without overtravel, so that after 180 degrees of rotation of cam 33, the high portion of cam 33 cooperates with follower roller 205. This action also caused rotation of prime mover mechanism 37 as hereinabove described which automatically drives universal tape transport drive means 7, 180 degrees counterclockwise. At this time any of the desired cartridges, namely cartridge 6 or cartridge 300 or cartridge 93 is manually injected into the still and movie camera-projector apparatus. Elements of switch 276 are in the opposite mode to that shown in FIG. 17. Contact 277 cooperates with contacts 279 thereby applying power to demodulator 294, to contact 317 of switch 316, and to contact 202 of microswitch 200 when switch 301 is manually operated causing contact 302 to cooperate with contact 303 and also to apply power to still shutter activate solenoid 74 holding said still shutter in open mode during projection of still visual information frames. Contact 280 cooperates with contact 282 thereby electrically disconnecting exciter oscillator 292 from exciter windings of head 232 and contact 283 cooperates with contact 285 thereby electrically connecting input of demodulator 294 to output of amplifier 293, and output of demodulator 294 is electrically connected to loud speaker 231, and contact 286 cooperates with contact 288 thereby electrically connecting the signal winding of record-reproduce head 232 to the input of amplifier 293, and contact 289 cooperates with contact 291 thereby electrically connecting and energizing projection lamp 60 for illumination of images of the visual information frames. Electrical power is also applied to exciter oscillator 292 and amplifier 293 from contact 309 of switch 308. During the projection mode, switch 301 is manually operated so that contacts 302 and 303 cooperate thereby energizing still shutter activate solenoid 74 inasmuch as contact 303 is electrically connected to contact 298 of push button 295 thereby energizing solenoid 74. When contactor 296 of make before break push button 295 is manually momentarily depressed, motor 15 is energized and remains energized during 360 degrees of cam 17 rotation as above described in the "Operational Relationships in Still Camera Mode" dealing with the flux responsive recording method.

*Operational relationships in movie camera mode.*—Referring to FIGS. 1, 2, 3, 4, 5, 6, 7, 8, 9, 10, 11, 17, and 18, and referring particularly to FIG. 8 where flux rate of change head 130 is utilized, power is applied by manually operating switch 142 causing cooperation of contacts 143 and 144. Power is instantly applied through cooperating contact pair 146 and 148, to contacts 209, 195, 198, and 202 so that power is available at switch 208, push button 192, and microswitch 200. Contact 149 cooperates with contact 151 (no circuit is connected thereto) and contacts 152 cooperates with contact 154 (no circuit is connected thereto). The mode of operation of switch 155 is identical to that heretofore discussed in "Operational Relationships in Still Camera Mode." Push buttons 175 and 179 have power removed therefrom, so that the sound track record-reproduce assembly 110 is not electrically energized and hence not operable, so that head 130 is stationary, extending into aperture 63. Either cartridge 6, cartridge 300, or cartridge 93, may be manually inserted into the said still and movie camera-projector apparatus so that prime mover 37 will drive the universal tape transport drive means 7 which in turn drives the sound tape transport means 54 and visual information tape transport means 55. When push button 192 is manually depressed and held manually depressed, electrical power will be applied due to contactor 194 cooperating with contacts 195 and 196 to still shutter activate solenoid 74, holding still shutter open inasmuch as ring 71 is set to the bulb position, and electrical power is applied to motor 20 because contactor 197 cooperates with contacts 198 and 199 thereby energizing motor 20. Motor 20 rotates shaft 21 which drives frame rate control mechanism 22, which had been preset to a predetermined rate of frame transportation and the output shaft 34 of mechanism 22 drives gear 24 in combination with free wheeling clutch 23 as well as driving gear 25 which is mechanically coupled to and cooperates with gear 28 which in turn drives shaft 27 and cams 32 and 33 affixed mechanically thereon and shaft 27 driving gear 29 cooperating with gear 30 affixed on rotatable shutter 31, thereby automatically rotating shutter 31. Microswitch 200 and cam 32 synchronize the rotation of shutter 31 with the transportation of tape 51 so that power is maintained supplied to motor 20 even if push buton 192 is physically and manually released, because power applied to contact 202 due to rotation of cam 32 causing follower roller 201 to follow the low portion of cam 32 until 360 degrees of cam 32 rotation is completed because contact 202 will cooperate with contact 203 supplying power to motor 20 during the period when follower roller 201 is on the low portion of cam 32. Therefore, power will be removed from motor 20 when the high portion of cam 32 completes 360 degrees of rotation and again cooperates with follower roller 201 causing the ceasing of cooperation between contacts 202 and 203 and motor 20, and inasmuch as motor 20 has a built in brake, motor 20 will stop instantly on de-energization without overtravel. This will occur when manual operation of push button is discontinued. During rotation of motor 20, gear 18 will idle due to free wheeling action of clutch 19 hereinabove described.

Referring particularly to FIG. 17 where the movie camera mode with flux responsive record-reproduce head 232 is utilized, power is applied by manually operating switch 142 causing cooperation of contacts 143 and 144. Power is instantly applied through cooperating contacts 309 and 311 thereby supplying power to contact 277 of switch 276, exciter oscillator 292, record-reproduce amplifier 293, and contact 289 of switch 276. Camera-project and record-reproduce switch 276 is in the mode shown in FIG. 17 so that power is applied to still shutter activate solenoid 74 so that solenoid 74 may maintain still shutter in open position when ring 71 is set to the bulb position, contact 314 of push button 312 is electrically energized, and power is applied to contact 202 of microswitch 200. Contact 280 cooperates with contact 281 so that the output of exciter oscillator 292 is electrically connected to exciter windings of flux responsive record-reproduce head 232. Contact 283 is in cooperative relationship with contact 284 so that the output of record-reproduce amplifier 293 is electrically connected to signal windings of flux responsive record-reproduce head 232. Contact 286 cooperates with contact 287 thereby electrically connecting microphone pair 230 (only one microphone is shown) to the input of record-reproduce amplifier 293. Contact 289 cooperates with contact 290 which does not involve any circuitry. At this time either cartridge 6, cartridge 300, or cartridge 93 is manually inserted into the still and movie camera-projector apparatus. Since head 232 is fixed, recording of sound will take place when sound tape 41 is transported by the tape transport means 54 relative said head 232, as well as visual information tape 51 being transported by visual information tape transport means 55, both said transport means driven by the universal tape transport drive means 7 which in turn is driven by prime mover means 37. When push button 312 is manually operated so that contactor 313 cooperates with contacts 314 and 315, power is applied to motor 20 which rotates shaft 21 and which in turn drives frame rate control mechanism 22, said mechanism being preset to a predetermined rate of frames setting, and output shaft 34 of frame rate mechanism 22 drives gears 24 and 25 which in turn drives gear 28, shaft 27, cams 32 and 33, gears 29 and 30 and shutter 31. Shutter 31 is driven in a clockwise direction as shown in FIG. 6. Follower roller 201 normally cooperates with the high portion of cam 32, but when shaft 27 drives cam 32, contacts 202 and 203 will maintain power to motor 20. Universal tape transport drive means 7, driven by motor 20, drives sound tape transport and visual information tape transport means 54 and 55, establishing the smooth transportation of tape 41 relative the flux responsive record-reproduce head 232 and thereby recording sound on said tape while visual information images of motion pictures are impinged on tape 51 and the impulsive transportation of frames of said tape 51 during which period the shutter 31 blocks the aperture of the iris and lens assembly. Motion pictures and accompanying sound track are thereby photographed and recorded respectively until push button 312 is manually released. If the push button 312 is released during the period when follower roller 201 cooperates with the low portion of cam 32 maintaining cooperation of contacts 202 and 203 and power from motor 20 will not be removed until the high portion of cam 32 again cooperates with follower roller 201 thereby causing contacts 202 and 203 of microswitch 200 to cease to cooperate with each other and thereby removing power from motor 20. Motor 20 has a built in brake so that upon automatic deenergizing of said motor 20, said motor 20 will stop instantly without overtravel.

*Operational relationships in movie projector mode.—*
Referring to FIGS. 1, 2, 3, 4, 5, 6, 7, 8, 9, 10, 11, 17, and 18, and considering the movie projector mode and referring particularly to FIG. 8 where flux rate of change 130 is utilized, power is applied by manually operating switch 142 causing cooperation of contacts 143 and 144. Power is instantly applied through cooperating contact pair 146 and 148, cooperating contact pair 149 and 151, and cooperating contact pair 152 and 154 identically as described in "Operational Relationships in Movie Camera Mode" hereinabove described. The mode of operation of switch 155 is identical to that heretofore discussed in "Operational Relationships in Still Projector Mode." Push buttons 175 and 179 have power removed therefrom, so that the sound track record-reproduce assembly 110 is not electrically energized and hence not electrically operable (except for the signal leads to head 130), so that head 130 is stationary in aperture 63. Either cartridges 6, 300, or 93 may be manually inserted into the said still and movie camera-projector apparatus so that prime mover 37 will drive the universal tape transport drive means 7 which in turn drives the sound tape transport means 54 and the visual information tape transport means 55. When movie projector control switch 208 is manually operated so that movable contact 209 cooperates with stationary contact 210, power from contact 148 applied to contact 209 electrically connected thereto will cause power to be applied to motor 20 and to contact 202 of microswitch 200 thereby energizing motor 20 and causing motor 20 to drive its output shaft 21, and at a preselected rate of frame rate control mechanism 22, shaft 34, gears 24 and 25, and gear 28 cooperating with gear 25 and driving shaft 27 with cams 32 and 33 and gear 29 mounted on said shaft 27, and gear 29 cooperates with gear 30 driving shutter 31 in a clockwise direction as viewed in FIG. 6. Simultaneously, gear 18 rotates freely due to action of free wheeling clutch 19 associated therewith as hereinabove described. As cam 32 is automatically rotated due to rotation of shaft 27, follower roller 201 following cam 32 cooperates with cam 32 on the low portion of said cam 32 thereby causing contacts 202 and 203 of microswitch 200 to cooperate with each other and maintain power to motor 20 for as long as the follower roller 201 is on the low portion of cam 32 or for as long as contacts 209 and 210 cooperate with each other. Should switch 208 be manually operated to cause contacts 209 and 210 to cease cooperating with each other while follower roller 201 is on the low portion of cam 32, then motor 20 will remain energized until the high portion of cam 32 cooperates with follower roller 201 thereby causing contacts 202 and 203 to cease cooperating with each other and thereby deenergizing motor 20. When this occurs motor 20 will stop instantaneously without overtravel due to built in brake therein. It should be noted that motor 20 drives universal tape transport drive means 7 which in turn drives sound tape transport means 54 smoothly to reproduce the sound track from sound tape 41 being driven thereby, and drives visual information tape transport means 55 in an impulsive manner thereby transporting visual information frames of tape 51 during the period when shutter 31 blocks the light from projection lamp 60, but otherwise projects motion picture images from said tape 51 to an external screen, and synchronizing rotation of shutter 31 with projection of images of said tape 51 and simultaneously reproducing sound from sound track of tape 41.

Referring particularly to FIG. 17 where the movie projector mode with flux responsive head 232 is utilized, power is applied by manually operating switch 142 causing cooperation of contacts 143 and 144. Power is instantly applied through cooperating contacts 309 and 311 thereby supplying power to contact 277 of switch 276, thereby applying power to contact 317 of switch 316 and to demodulator 294 which is connected to loud speaker 231, to exciter oscillator 292, to record-reproduce amplifier 293, to contact 289 of switch 276, to still shutter activate solenoid 74 so that solenoid 74 may maintain still shutter in open position when ring 71 is set to the bulb position, and to contact 202 of microswitch 200 which has power applied thereto by virtue of its electrical connection to contact 277. Contact 280 and 282 cooperate with each other thereby disconnecting exciter oscillator 292 from exciter oscillator windings of flux responsive record-reproduce head 232, and contact 283 cooperates with contact 285 thereby electrically connecting output of record-reproduce amplifier 293 with input of demodulator 294. Contact 286 cooperates with contact 288 thereby electrically connecting the input of record-reproduce amplifier 293 with signal windings of the flux responsive record-reproduce head 232. Contact 289 cooperates with contact 291 thereby electrically connecting power to and energizing projection lamp 60. At this time either cartridge 6, cartridge 300, or cartridge 93 is manually inserted into the still and movie camera-projector apparatus. Since head 232 is fixed, reproducing of sound will take place when sound tape 41 is transported by the sound tape transport means 54 relative said head 232 as well as visual information tape 51 which is transported by visual information tape transport means 55, both said transport means driven by the universal tape transport drive means 7 which is in turn driven by prime mover means 37. When movie projector toggle switch 316 is manually operated so that contact 317 cooperates with contact 318, power is applied to motor 20 which rotates shaft 21 and which in turn drives frame rate control mechanism 22, said mechanism 22 being preset to a predetermined rate of frames comparable to the rate of frames at which the frames were initially photographed, and output shaft 34 of frame rate mechanism 22 drives gears 24 and 25 which in turn drives gear 28, shaft 27, cams 32 and 33, gears 29 and 30, and shutter 31. Shutter 31 is driven in a clockwise direction as shown in FIG. 6. Follower roller 201 normally cooperates with the high portion of cam 32, but when shaft 27 drives cam 32 contacts 202 and 203 will maintain power to motor 20 due to cooperation of said contacts. Universal tape transport drive means 7, driven by motor 20, drives sound tape transport and visual information tape transport means establishing the smooth transportation of tape 41 relative the flux responsive record-reproduce head 232 and thereby reproducing sound from said tape while visual information images of motion picture frames are projected from tape 51 and impulsive transportation of frames of said tape 51, during which period the shutter 31 blocks the aperture of the iris and lens assembly takes place, and cooperation of the teeth of partial gear 10 with the teeth of gear 53. Motion pictures and accompanying sound track are thereby respectively projected and reproduced until switch 316 is manually operated so that cooperating contacts 317 and 318 cease to cooperate. If switch 316 is manually operated during the period when follower roller 201 cooperates with the low portion of cam 32 maintaining cooperation of contacts 202 and 203, power will not be removed from motor 20 until the high portion of cam 32 again cooperates with follower roller 201 thereby causing contacts 202 and 203 of microswitch 200 to cease to cooperate. Motor 20 has a built in brake so that upon automatic deenergizing of motor 20, motor 20 will stop instantly without overtravel.

*Combination derived from the still and movie camera-projector apparatus.—*Referring to FIGS. 1, 2, 4, 5, 6, 7, 8, 9, 10, 11, and 18, a still camera with sound, a still projector with sound, a still camera-projector with sound, a movie camera-projector with sound, and a still-movie camera with sound, and a still-movie projector with sound, may be derived from the still and movie camera-projector apparatus.

The still camera with sound is derived by deleting from the still and movie camera-projector apparatus as hereinabove described, movie projection control switch 208, movie camera control push button 192, movie shutter assembly 40, movie frames advance motor 20, frame rate control mechanism 22, free wheeling clutch 23, movie frames advance gear 24, movie transport means drive gear 25, projection lamp 60, loud speaker 211, automatic sequencing still visual information frames and sound tracks microswitch 106, automatic sequence reproduce and cycle still visual information frames and sound tracks switch 183, movie frames advance motor synchronizing microswitch 200, movie shutter open positioning microswitch 204, movie shutter 31. Wires as shown in FIG. 8 between contacts 150 and 206, between contacts 148 and 195, between contacts 178 and 196, between contacts 196 and 158, between contacts 182 and 184, between contacts 185 and 108, and between contacts 109 and 104 are removed thereby electrically disconnecting said deleted components. The remaining components therefore constitute a still camera with sound.

The still projector with sound is derived by deleting from the still and movie camera-projector apparatus as hereinabove described, still shutter trigger push button 175, movie projector control switch 208, movie camera control push button 192, movie frames advance motor 20, frame rate control mechanism 22, free wheeling clutch 23, movie frames advance gear 24, movie transport means drive gear 25, movie shutter assembly 40, movie frames advance motor synchronizing microswitch 200, movie shutter open positioning microswitch 204, exciter oscillator 292, automatic-manual sound track record selector switch 171, and microphone pair 212. Wires as shown in FIG. 8 are removed and electrically disconnected between contacts 158 and 196, between contacts 196 and 178, between contacts 178 and 173, between contacts 172 and 153, between contacts 147 and 148, between contacts 172 and 153, between contacts 147 and 148, between contacts 209 and 195, between contacts 210 and 199, between contacts 148 and 195, between contacts 150 and 206, between contact 156 and the exciter oscillator power input, between the exciter oscillator signal output and contact 163, and between contact 169 and microphone pair 212, thereby electrically disconnecting the said deleted components. Contact 158 is electrically connected to input side of still shutter activate solenoid 74 in order to maintain said still shutter open when projecting still visual information images. The remaining components therefore constitute a still projector with sound.

The still camera-projector with sound is derived by deleting from the still and movie camera-projector apparatus as hereinabove described, movie frames advance motor 20, frame rate control mechanism 22, movie frames advance gear 24, free wheeling clutch 23, movie transport means drive gear 25, movie shutter assembly 40, movie frames advance motor synchronizing microswitch 200, movie shutter open positioning microswitch 204, movie projector control switch 208, movie camera control push button 192. Wires as shown in FIG. 8 between contacts 178 and 196, between contacts 148 and 195, between contacts 150 and 206, and between contacts 158 and 196, are removed thereby electrically disconnecting the said deleted components. A wire is electrically connected between contact 158 and 178 in order to provide constant power to still shutter activate solenoid during the still image project mode. The remaining components therefore constitute a still camera-projector with sound.

The movie camera-projector with sound is derived by deleting from the still and movie camera projector apparatus as hereinabove described, still shutter trigger push button 175, automatic-manual sound track record selector switch 171, sound track scan control push button 179, sound track record-reproduce assembly 110 except record-reproduce head 130 mechanically affixed to the end of a bracket and cooperating with sound tape 41 in aperture 63 while the other end of the said bracket is affixed to main base plate 1, still frames advance motor synchronizing microswitch 102, automatic sequencing still visual information frames and sound tracks microswitch 106, still frames advance motor 15, synchronizing cam 17, still frames advance drive gear 18, free wheeling clutch 19, and still shutter activate solenoid 74. Wires as shown in FIG. 8 between contacts 178 and 196, between contacts 178 and 173, between contacts 172 and 153, between contacts 147 and 148, between contact 178 and input to still shutter activate solenoid 74, between contacts 149 and 181, between contacts 152 and 182, between contact 182 and input to relay coil 187, between contacts 182 and 188, between contacts 147 and 190, between contacts 182 and 184, between contacts 185 and 108, between contacts 109 and 104, between contacts 120 and 147, between contacts 104 and 120, between contacts 105 and 122, and between 105 and input to motor 15, are removed thereby electrically disconnecting the said deleted components. The remaining components therefore constitute a movie camera-projector with sound.

The still-movie camera with sound is derived by deleting from the still and movie camera-projector apparatus as hereinabove described, projection lamp 60, loudspeaker 211, automatic sequencing still visual information frames and sound tracks microswitch 106, and automatic sequence reproduce and cycle still visual information frames and sound tracks switch 183. Wires as shown in FIG. 8 between contact 161 and input to projection lamp 60, between contact 167 and input to loud speaker 211, between contacts 109 and 104, between contacts 108 and 185, and between contacts 184 and 182, are removed thereby electrically disconnecting the said deleted components. The remaining components therefore constitute a still-movie camera with sound.

The still-movie projector with sound is derived by deleting from the still and movie camera-projector apparatus as hereinabove described, microphone pair 212, exciter oscillator 291, still shutter trigger push button 175, automatic-manual sound track record selector switch 171. Wires as shown in FIG. 8 between contact 169 and input to microphone pair 212, between contact 163 and output of exciter oscillator 292, between contact 156 and power input to exciter oscillator 292, between contacts 196 and 178, between contacts 178 and 173, between contacts 172 and 153, between contacts 147 and 148, between contact 178 and input to still shutter activate solenoid 74, and between contacts 152 and 182 are removed thereby electrically disconnecting the said deleted components, and contact 196 is electrically connected to the input to still shutter activate solenoid 74 in order to provide constant power to solenoid 74 during movie projector mode so as to maintain still shutter in an open mode. The remaining components therefore constitute a still-movie projector with sound.

It is obvious that in each of the said combinations derived from the said still and movie camera-projector apparatus as above described, that the flux responsive record-reproduce head 232 could have been utilized in lieu of the flux rate of change head 130.

*Still camera-projector specific configuration.*—Referring to FIGS. 12, 13, and 15, a still camera-projector specifically devised for optically photographing and projecting still (non-motion picture) images of visual information on frames of a photographic tape and for recording on and reproducing sound from sound tracks of a tape coated with magnetic material and the sound tracks correspond with each of the said visual information frames, is based upon the concepts hereinabove described in the still and movie camera-projector apparatus, as will be evidenced by the reuse of many of the important components used in the said still and movie camera-projector apparatus. Camera-projector case 225 has compartments 234, 331, 332, and 333. Compartment 332 containing projector reflector 233 mechanically affixed to the rear of case 225 has mechanically retained therein projection lamp 60. Mechanically affixed under reflector 233 in compartment 332 to case 225 is flux responsive record-reproduce head 232. Also mechanically affixed in compartment 332 to rear of case 225 is loud speaker 231 and one of the pair of microphones 230. The compartment 234 of case 225 is used for electronics such as exciter oscillator 292, record-reproduce amplifier 293, and demodulator 294. Make before break push button 295 together with a frame counter (not detailed, only dial is shown) is mechanically affixed to the upper portion of case 225 in compartment 332. Rewind motor push button 304 is mechanically affixed to the upper portion of compartment 332 of case 225. The rear portion of case 225 is hinged on one side to the front portion of case 225. The lower end of the front portion of case 225 has compartment 331, the base of the front portion of case 225 also forming the base of compartment 331. Prime mover 253 is located in compartment 331 and is comprised of tape transport drive motor 235 mechanically affixed to base of compartment 331, synchronizing cam 239 which is mechanically affixed to shaft 237 of clutch 238, and electromechanical clutch 238 which is mechanically affixed to frame of motor 235 and mechanically linked with the shaft of motor 235, said linkage or coupling between clutch 238 and motor 235 is as hereinabove described, and as described in detail as assembly 109 of FIG. 4 of U.S. Patent No. 3,251,263 patented May 17, 1966 by the same inventor under application Ser. No. 263,164, filed Mar. 6, 1963. Synchronizing cam 239 is mechanically coupled to output shaft of electromechanical clutch 238 and affixed thereto mechanically and used for synchronizing motor 235 so that said motor 235 and the mechanism it drives stop at a fixed predetermined position corresponding with a single 360 degree rotation of cam 239. Prime mover 253 is as simple in structure and similar in function to the portion of prime mover 37 comprising motor 15, cam 17, gear 18, and free wheeling clutch 19 as viewed in FIG. 6. Mechanically affixed to the base of compartment 331 is synchronizing microswitch 240 and follower roller 241 rotatably affixed to movable contact 242 of microswitch 240, said follower roller 241 cooperates with cam 239. During the normal or deenergized mode of motor 235, cam 239 cooperates with the high portion of follower roller 241 and during the energized mode of motor 235 follower roller 241 cooperates with the low portion of cam 239. Output shaft 237 of electromechanical clutch 238 is keyed with and mechanically coupled to the lower portion of tape transport drive shaft 244. Directly above cam 239 in compartment 333 and towards the lower end of tape transport drive shaft 244 is sound tape transport driving gear 245 for smoothly driving sound tape transport driven gear 247, and partial gear 246 is mechanically affixed near the top of shaft 244, said partial gear 246 being identical with partial gear 10 of FIG. 6, for impulsively driving visual information tape transport driven gear 249. Said shaft 244, gear 245, and partial gear 246 comprise universal tape transport drive means 252. The upper end of shaft 244 is mechanically held in a sleeve bearing recessed in the inner surface of case 225. Mechanically affixed to the front wall of compartment 333 is the other of the pair of microphones 230. Mechanically affixed to the top of case 225 corresponding to the top external surface of compartment 333 is camera viewer, rangefinder, and electronics for automatically adjusting iris and still shutter speed combinations and the said viewer, rangefinder and electronics is housed in compartment 227. Photoelectric cell 229 mechanically affixed to the surface of compartment 227 is connected to the electronics within compartment 227 (not shown). Focus and range finder viewer aperture 228 is an integral portion of and is built into compartment 227. Still camera-projector lens, light aperture adjust iris, focus and range finding adjust ring and adjust arm, and ASA film speed select ring together with still shutter and still shutter activate solenoid which is mechanically affixed to still shutter and is mechanically linked to said shutter, comprises assembly 226 which is mechanically affixed to external surface of compartment 333 of case 225. Assembly 226 less the still shutter and solenoid 74 is identical to assembly 65 to FIG. 1. Mechanically affixed to the base of compartment 331 is tape rewind motor 236. Electromechanical clutch 264 identical to electromechanical clutch 238 is mechanically affixed to the frame of motor 236 and is mechanically linked with the shaft of motor 236. Tape rewind motor synchronizing cam 266 is mechanically affixed to output shaft 263 of electromechanical clutch 264. Motor 236, electromechanical clutch 264, and cam 266 comprise reverse mover 330. Tape rewind motor synchronizing microswitch 267 is mechanically affixed to the base of compartment 331 and follower roller 268 rotatably mechanically affixed to the tip of movable contact 269 of microswitch 267, cooperates with cam 266. When motor 236 is deenergized, follower roller 268 cooperates with the high portion of cam 266 but after motor 236 becomes energized follower roller 268 moves from the high to the low portion of cam 266 thereby causing cooperation of contacts 269 and 270. Output shaft 263 of electromechanical clutch 264 is keyed with and mechanically coupled to the lower portion of tape transport drive shaft 347 located in compartment 333. Mechanically affixed to the lower end of shaft 347 is sound tape rewind gear 265, and to the higher end of shaft 347 is partial gear 348. Partial gear 348, gear 265, and shaft 347 are respectively identical to partial gear 246, gear 245, and shaft 244. However, the orientation of the teeth of partial gear 348 is 180 degrees out of phase with respect to the teeth of partial gear 246 in the power-off mode, inasmuch as this orientation will permit non-interference with manual injection of cartridge 125 into compartment 333 and will not hinder takeup or rewind operations. Partial gear 348, gear 265, and shaft 347 comprise universal tape transport rewind means 346 utilized in the identical manner for rewind of tapes as universal tape transport drive means 252 is used for take-up of tapes, except that the direction of rotation of assembly 346 during rewind is opposite to the direction of rotation of assembly 252 during takeup. Upon injection of cartridge 125, gear 340 will cooperate with gear 348, and gear 271 will cooperate with gear 265, and similarly, gear 246 will cooperate with gear 249 and gear 245 will cooperate with gear 247. Cartridge 125 is comprised of case 256 and cover 257 which has cover pins 258 as integral portions thereof for insertion into holes in case 256 so as to mechanically hold cover 257 to case 256. Case 256 has film exposure aperture 260 adjacent to lens and shutter assembly 226, and cover 257 has projection lamp admittance aperture 261 and record-reproduce head admittance aperture 262. Case 256 mechanically retains therein visual information tape transport takeup spool 250 and sound tape transport takeup spool 248 mechanically separately rotatable. Shaft 342 is structured in two individually separately rotatable portions telescoped into each other and cooperating at interface line 350 and each portion is separately rotatable without rotating the other portion. Each portion of shaft 342 is respectively affixed mechanically to spools 250 and 248 so that spool 250 rotates about its axis when the upper portion of shaft 342 is rotated and spool 248 rotates about its axis when the lower portion of shaft 342 is rotated. Shaft 342 extends through the top and bottom surfaces of case 256. Mechanically affixed to the end of shaft 342 at the top of case 256 is visual information tape transport driven gear 249 and mechanically affixed to the end of shaft 342 extending through the bottom surface of case 256 is sound tape transport driven gear 247. Tape guide and registration sprockets 251 are integral portions of spools 248 and 250. A slot in each of spools 248 and 250 is provided parallel to the axes of spools 248 and 250 together with spring clips so as to insert and mechanically retain therein respectively the ends of sound tape 41a and visual information tape 51a. Sprocket holes are provided in each of said tapes 41a and 51a for cooperative engagement with sprockets 251 on spools 248 and 250 thereby guiding and maintaining registration of said tapes 41a and 51a with respect to each other during transportation of said tapes 41a and 51a. Storage spool 334 has slot at its axis and a spring clip for inserting and holding therein the other end of tape 41a. Tape 41a is initially wound on spool 334. Spool 334 has a cylindrical depression 335 at its axis with a bar therein across the diameter of the said cylindrical depression for engagement with a slot at the end of shaft 343, said slotted shaft snap fitting over said bar in cylindrical depression 335 of spool 334, and the other end of shaft 343, mechanically retaining and holding thereto gear 271. The upper end of spool 334 has a cylindrical depression 337 for accepting a cylindrical rod 338 at the axis of spool 336. Rod 338 may be freely rotated in said depression 337. Spool 336 has a slot and a spring clip at its axis for mechanically holding the other end of tape 51a. Tubular cylindrical rod 338 has a bar across the diameter of the cylinder which is mechanically affixed near the top of said cylindrical opening for snap fitting over said bar, slotted portion of shaft 341 at one end of shaft 341. Said shaft 341 extends through an aperture in the top of case 256 and has mechanically affixed thereto gear 340. Tubular cylindrical rod 338 is mechanically affixed to spool 336 thereby making spool 336 rotatable when tubular cylindrical rod 338 is automatically rotated at a time when tape 51a is being automatically unwound from spool 336 and transported to spool 250. Enclosure 344 is circumjacently and rotatably mounted with respect to spool 336, said enclosure 344 has slot 339 therein from which extends the end of tape 51a. This enclosure 344 is optional inasmuch as it permits loading and unloading of undeveloped tape 51a into and from cartridge 125. It is noted herein that the combination of spool 336, cylindrical rod 338, tape 51a, enclosure 344 with slot 339 therein, comprise a commercially available 35 millimeter roll film package 345 which may be utilized wtihin cartridge 125.

However, should roll film package 345 not be desired, the structure of the roll film package 345 deleting enclosure 344 may be used equally effectively. It is noted that enclosure 344 is provided for film package 345 commercially only because the film does not have a cartridge case such as case 256 and hence must be protected from light exposure prior to and after photographing when loading or unloading said roll film package 345 in connection with an ordinary 35 millimeter camera. When tapes 41a and 51a are being transported due to rotation of motor 235, gear 340 will drive gear 348 impulsively, and gear 271 will drive gear 265 smoothly, and assembly 346, cam 266, and shaft 263 will independently rotate freely due to disengagement of said shaft 263 from motor 236 by action of clutch 264, thereby permitting independent rotation of spool 334 with respect to spool 336, and synchronization of tapes 41a and 51a at the end of each transportation of a frame of tape 51a enables total tape takeup control by prime mover 253 in combination with universal tape transport means 252. Gear 265 cooperating with gear 271 and gear 348 mechanically affixed to the upper end of shaft 347 cooperating with gear 340 will cause rotation of spools 334 and 336 and hence the winding up of tapes 41a and 51a on said spools 334 and 336. It should also be noted that during tape transport and takeup action, clutch 238 is deenergized and engaged with motor 235, while clutch 264 is energized and hence disengages motor 236, whereas during rewind action clutch 238 is energized and disengages motor 235, while clutch 264 is deenergized and hence mechanically couples motor 236 to shaft 263, cam 266, and universal tape transport rewind means 346. In the power-off mode however, both electromechanical clutches 238 and 264 will be deenergized thereby engaging motors 235 and 236 and their respective mechanical loads. Sound tape registration markings 254 are imprinted at the takeup spool 248 end of tape 41a, and visual information tape registration markings 255 are imprinted at takeup spool 250 end of tape 51a. These registration markings are used to align and register tape 41a with tape 51a prior to recording and photographing images and are also used to align and register said tapes 41a and 51a with respect to each other after the photographed tape 51a had been developed and reinstalled in cartridge 125, so that images of frames of tape 51a will correspond with the sound recorded on and reproduced from tape 41a. Swinging the rear portion of case 225 so that the edges comprising compartment 332 snap fit into and cooperate with the inner surfaces of compartment 333, the gap of record-reproduce flux responsive head 232 will be positioned so as to cooperate with magnetically coated surface of sound tape 41a, said head 232 extending into aperture 262, and reflector 233 and projection lamp 60 will be adjacent to aperture 261, and aperture 260 will face optical assembly 226 so that the apparatus may now be used as either a camera or a projector with sound for still or motionless visual information images. When prime mover 253 is automatically operated thereby rotating automatically universal tape transport drive means 252, sound tracks of sound tape 41a will be transported smoothly with corresponding frames of visual information tape 51a which will be transported impulsively inasmuch as gear 246 has gear teeth at only 90 degrees of its peripheral circumference, the remainder of the circumference of gear 246 not having teeth so that only during 90 degrees of rotation of universal tape transport drive means 252 will visual information tape 51a be transported. When reverse mover 330 is automatically operated thereby rotating universal tape transport rewind means 346, tape 41a will be transported smoothly with corresponding frames of visual information tape 51a which will be transported impulsively inasmuch as gear 348 has gear teeth at only 90 degrees of its peripheral circumference, the remainder of circumference of gear 348 does not have teeth so that only during 90 degrees of rotation of universal tape transport rewind means 346 will visual information tape 51a be transported and rewound.

Sound and visual information tape cartridge 125 is similar in function to cartridge 93 of FIG. 9, but have different structures. Nevertheless, the structure of cartridge 93 may be modified for use in lieu of cartridge 125. The universal tape transport drive means 252 requires modification by relocation of the partial gear 246 and gear 245, and transposition of the sound tape and sound tape transport means with the visual tape and visual tape transport means would have to be accomplished, as well as reducing the width of the sound tape, and changing the locations of record-reproduce head injection aperture, visual information tape aperture, and projection lamp aperture. These modifications and changing the shape of the case of cartridge 93 would permit the use of cartridge 93 in lieu of cartridge 125. It is noted that in this case, the universal tape transport rewind means 346 and the reverse mover 330 will not be required. Power input means 140 is electrically connected by means of wire to movable contact 143 of power control switch 142. Stationary contact 144 of switch 142 is electrically connected by means of wire to movable contact 273 of camera-project and rewind switch 272, and to movable contact 289 of camera-project and record-reproduce switch 276. Stationary contact 274 of switch 272 is electrically connected by means of wire to movable contact 277 of switch 276. Movable contact 277 of switch 276 is electrically connected by means of wire to record-reproduce amplifier 293 supplying power thereto when switch 272 is in the camera-projector mode. Stationary contact 278 of switch 276 is electrically connected by means of wire to exciter oscillator 292 thereby supplying power to exciter oscillator 292 when switch 276 is in the record mode and switch 272 is in the camera-projector mode. Stationary contact 279 of switch 276 is electrically connected to demodulator 294 thereby supplying power to modulator 294 when switch 276 is in the reproduce mode and switch 272 is in the camera-projector mode, and contact 279 is also electrically connected by means of wire to movable contact 302 of project mode solenoid activate switch 301 thereby supplying power to contact 302 when switch 276 is in the reproduce mode and switch 272 is in the camera-projector mode. Contact 275 of switch 272 is electrically connected by means of wire to contact 306 of rewind motor push button 304 thereby supplying electrical power to contact 306 when switch 272 is in the rewind mode. Contact 278 is electrically connected by means of wire to stationary contactor 297 of make before break push button 295 thereby applying electrical power to contactor 297 when switch 276 is in the record mode and switch 272 is in the camera-projector mode. Contactor 297 of switch 295 is electrically connected by means of wire to movable contact 242 of synchronizing microswitch 240 for motor 235. Contact 242 of microswitch 240 is electrically connected by means of wire to contact 302 of switch 301. Contact 242 of microswitch 240 is also electrically connected by means of wire to input side of electromechanical clutch 264. Contact 299 of push button 295 is electrically connected by means of wire to contact 243 of microswitch 240. Stationary contact 243 of microswitch 240 is electrically connected by means of wire to input side of tape transport drive motor 235. Contact 298 of push button 295 is electrically connected by means of wire to stationary contact 303 of switch 301 and to input of still shutter activate solenoid 74. Contact 306 of rewind motor push button 304 is electrically connected by means of wire to input of electromechanical clutch 238. Stationary contact 306 of push button 304 is electrically connected by means of wire to movable contact 269 of tape rewind motor synchronizing microswitch 267. Stationary contact 307 of push button 304 is electrically connected by means of wire to stationary contact 270 of tape rewind motor synchronizing microswitch 267 and to input side of tape rewind motor 236. Output of exciter oscillator 292 is electrically connected by means of wire to movable contact 280 of switch 276. Stationary contact 281 of switch 276 is electrically connected by means of wire to input side of exciter windings of flux responsive record-reproduce head 232. Output of record-reproduce amplifier 293 is electrically connected by means of wire to movable contact 283 of switch 276. Stationary contact 284 of switch 276 is electrically connected by means of wire to input side of signal windings of flux responsive record-reproduce head 232 and to stationary contact 288 of switch 276. Stationary contact 285 of switch 276 is electrically connected by means of wire to input side of demodulator 294 while output side of demodulator 284 is electrically connected by means of wire to input side of loud speaker 231. Movable contact 286 of switch 276 is electrically connected by means of wire to input side of record-reproduce amplifier 293. Stationary contact 287 of switch 276 is electrically connected by means of wire to input side of microphone pair 230 (only one microphone is shown, microphones are connected in parallel). Stationary contact 291 of switch 276 is electrically connected by means of wire to input side of projection lamp 60. Common power and signal return means 141 is electrically connected to return sides of exciter oscillator 292, record-reproduce amplifier 293, demodulator 294, exciter oscillator and signal windings of flux responsive head 232, loud speaker 231, microphone pair 230, projection lamp 60, still shutter activate solenoid 74, tape transport drive motor 235, tape rewind motor 236, and electromechanical clutches 238 and 264.

In the power-off mode contacts 143 and 144 do not cooperate with each other, however, when in the camera-record, projector-reproduce, or rewind of tape modes, contact 143 must cooperate with contact 144 to provide power to the apparatus.

In the camera-record mode, contacts 273 and 274 of switch 272 cooperate with each other. Contact pairs 277 and 278, 280 and 281, 283 and 284, 286 and 287, and 289 and 290 (no circuit connected thereto) of switch 276 cooperate with each other in order to connect the recording means and disconnect the reproducing means. Exciter oscillator 292 will be electrically connected to exciter windings of record-reproduce head 232, output of record-reproduce amplifier 293 will be electrically connected to signal windings of head 232, and microphone pair 230 will be electrically connected to input of record-reproduce amplifier 293, so that when contactor 296 of make before break push button 295 is manually depressed, contactor 296 will first cooperate with contact 298 due to the curvature in contactor 296 and hence the closer proximity of contact 298 to contactor 296 thereby energizing still shutter activate solenoid 74 which triggers the still shutter at the preselected speed setting and admits light through the lens and iris combination thereby photographing an image on a frame of photographically sensitized tape 51a. Contactor 296 will also cooperate with contact 299 momentarily later thereby applying power to tape transport drive motor 235. Power is also applied to clutch 264 which energizes said clutch and removes the mechanical load represented by motor 236 so that when motor 235 is driving universal tape transport means 252 and cam 239, gear 249 is impulsively driven by partial gear 246 thereby impulsively driving visual information tape transport takeup spool 250, and gear 247 is smoothly driven by gear 245 thereby smoothly driving sound tape transport takeup spool 248, during the period when cam 239 is automatically rotated 360 degrees, whereby a single line of sound track will be recorded on tape 41a while the correspondingly photographed frame of visual information tape 51a is transported between 270 and 360 degrees after rotation of universal tape transport drive means 252 was automatically started, so that the next frame is in readiness for photographing of visual information together with the next corresponding line of sound track. It is noted that upon cooperation of contactor 296 with contacts 298 and 299, movable contactor 296 will cease cooperation with stationary contactor 297 until push button 295 is manually released. The make before break push button avoids complex control circuitry, but does not inhibit the recording or reproducing of sound inasmuch as movable contact 242 receives power from contactor 297. Movable contactor 242 has follower roller 241 rotatably attached thereto and cooperates with cam 239. Upon energizing of motor 235, engagement of clutch 238, and rotation of cam 239, cam 239 will automatically rotate causing follower roller 241 to move from the high to the low portion of cam 239, cause contacts 242 and 243 to cooperate with each other thereby supplying power to motor 235 even after push button 295 is manually released and maintaining said power until 360 degrees rotation of cam 239 has been automatically completed, at which time follower roller 241 will again cooperate with the high portion of cam 239 and cause contacts 242 and 243 to cease cooperating thereby deenergizing motor 235. Motor 235 has a built-in brake which upon deenergizing of said motor 235 causes motor 235 to stop armature rotation instantly and without overtravel thereby guaranteeing that the high portion of cam 239 will cooperate with follower roller 241. In the projector-reproduce mode, the electromechanical clutches 238 and 264 will be as in the camera-record mode, and push button 295 will be operable as heretofore described except that still shutter activate solenoid 74 will be continuously energized due to the fact that it will receive power continuously when switch 301 is manually operated thereby causing contacts 302 and 303 to cooperate with each other supplying power to solenoid 74 and to contact 297 due to cooperation of contact 277 with contact 279 of switch 276. Contact 280 will cooperate with contact 282 thereby disconnecting exciter oscillator 292 from the exciter windings of record-reproduce head 232, contact 283 will cooperate with contact 285 thereby electrically connecting the output of record-reproduce amplifier 293 to the input of demodulator 294 whose output is electrically connected to loud speaker 231, contact 286 cooperates with contact 288 thereby electrically disconnecting microphone pair 230 and connecting input of record-reproduce amplifier 293 to signal windings of flux responsive record-reproduce head 232, and contact 289 cooperates with contact 291 thereby energizing and illuminating projection lamp 60. In the projector-reproduce mode, contacts 273 and 274 will also cooperate with each other. Therefore, when push button 295 is manually depressed, contactor 296 will cooperate momentarily with contact 299 transferring power from contactor 296, energizing motor 235 and maintaining said motor 235 energized for the period during which 360 degrees of cam 239 is automatically rotated and the operation of the universal tape transport drive means 252, and the prime mover 253 comprised of motor 235, clutch 238, and cam 237, will perform exactly as specified in the camera-record mode, excepting that projection of still images and corresponding reproducing of sound tracks will replace the photographing of images and recording of corresponding sound tracks. It should be noted that sound recording or reproducing takes place for the 270 degrees of universal tape transport means 252 rotation, after which the injection of the next-in-line frame of visual information tape 51a utilizes the remaining 90 degrees of rotation of means 252. However, the operator of the camera may choose to use the additional said 90 degrees during which the visual information frame is being automatically transported for additional sound track recording, thereby extending the sound track recording time. It should also be noted, that in both the camera-record mode and in the projector-reproduce mode, clutch 264 is energized thereby disconnecting the load of motor 236. However, inasmuch as partial gear 348 cooperates with gear 340 during 90 degrees of gear 348 rotation, and gear 265 cooperates with gear 271, even if motor 236 is decoupled, universal tape transport rewind means 346, cam 266, and shaft 263 will be dragged during normal operation of tape transport drive means 252, and conversely when rewind action will take place, storage spools being driven by means 346 and electromechanical clutch 238 is energized hence uncoupling universal tape transport drive means 252, yet said means 252 will be similarly dragged during rewind action. The loads being dragged are comparatively small and represent small loading to the driving means. During said rewind action, contacts 273 and 275 of switch 272 will cooperate with each other but the position of switch 276 elements may be in either the record or reproduce mode. However, in the rewind mode, electromechanical clutch 238 will be energized thereby decoupling motor 235 therefrom and allowing universal tape transport drive means 252, cam 239, and shaft 237 to idle or be dragged due to rewind action and rotation of spools 336 and 334 when driven due to rotation of motor 236, deenergizing and engaging electromechanical clutch 264, rotating of shaft 263, cooperation of gear 265 with gear 271 smoothly driving and rotating spool 334, and partial gear 348 cooperating with gear 340 impulsively driving gear 340 a complete revolution for 90 degrees of gear 348 rotation, thereby winding up tapes 41a and 51a respectively on spools 334 and 336. This rewind action occurs when push button 304 is manually operated thereby causing cooperation between contactor 305 and contacts 306 and 307 which causes power to be applied to motor 236, starting rotation of motor 236, and engaging clutch 264, shaft 263 and cam 266 mechanically affixed thereto. A slight rotation of cam 266 will cause follower roller 268 of tape rewind motor synchronizing microswitch 267 to move from the high portion to the low portion of said cam 266 prior to the manual release of push button 304 thereby energizing motor 236 and maintaining power thereto through contacts 269 and 270 which will cooperate with each other when follower roller 268 is on the low portion of cam 266, until 360 degrees of cam 266 rotation is automatically completed whereby follower roller 268 will again cooperate with the high portion of cam 266 and cause contacts 269 and 270 to cease to cooperate thereby removing power from motor 236. Motor 236 will be instantaneously stopped when the high portion of cam 266 cooperates with follower roller 268 provided push button 304 is not manually being depressed, thereby assuring stopping of visual information tape 51a transportation at exactly when a full frame of said tape 51a is visible in aperture 261. This guarantees that the tapes 41a and 51a may be rewound and stopped at exactly the first frame or at exactly when the imprinted markings 254 and 255 are in aperture 261 by manually releasing push button 304 when either the said markings or first frame become visible in aperture 261. Motor 236 has a built-in brake which is operable when said motor is deenergized thereby guaranteeing the stopping of motor 236 without overtravel when the high portion of cam 266 cooperates with follower roller 268. It should be noted that the term still camera-projector refers to the apparatus which photographs images which are projected as motionless images, similar to slides, but are on a continuous tape or film strip with an accompanying sound track for each image as a separate corresponding synchronized sound tape.

*Motion picture camera-projector specific configuration.*—Referrings to FIGS. 12, 13, 14, 15, and 16, the structure of the motion picture camera-projector specific configuration is identical to that of the still camera-projector specific configuration as hereinabove described, except, that the prime mover 253 is replaced with prime mover 329, the difference being that frame rate control mechanism 22 mechanically coupled to output shaft 237 of electromechanical clutch 238 and utilized identically as hereinabove described in the still and movie camera-projector apparatus, is added. Also universal tape transport drive means 252 is replaced by universal tape transport drive means 328 which has partial gear 246 and tape transport drive shaft 244 as in means 252, but sound tape transport driving gear 245 is replaced by gear 324 with angularly pitched threads. The structural mounting in case 225 of prime mover 329 and universal tape transport drive means 328 is identical as for prime mover 253 and for universal tape transport drive means 252 respectively. The still shutter and the still shutter activate solenoid 74 may be deleted if desired, but it will be advantageous to retain these components so that when rewinding tape in the movie camera mode it will be possible to exclude light due to rotation of shutter 31 in that mode. However, when still shutter and solenoid 74 are deleted, then a cover over the lens assembly must be used in order to exclude light during the rewinding of tape 51a in the movie camera mode. A housing 68 is provided and is mechanically affixed adjacent to lens assembly and is used for retaining rotatable shutter 31 and movie shutter gear 30 mechanically affixed to shutter 31 and gear 30 is rotatable in shutter housing 68, and teeth of gear 30 cooperate with teeth of movie shutter drive gear 29, gear 29 is rotatably affixed within said housing 68 and gear 29 in turn is mechanically affixed to movie shutter drive shaft 27, shaft 27 being mechanically affixed so it extends into said housing 68 on one end and at the other end said shaft 27 is mechanically affixed to movie shutter drive coupling gear 319 which has angularly pitched threads which cooperate with angularly pitched threads of gear 324, and gear 319 is in cooperative engagement with gear 324 and the axes of rotation of gears 319 and 324 are orthogonal to each other. Therefore, transportation of a single frame of tape 51a due to a 360 degree rotation of universal tape transport drive means 328 will cause a 360 degree rotation of shaft 27, gears 29 and 30, and hence shutter 31. Shutter 31 will be rotated its complete 360 degrees during rotation of gear 324 to which it is mechanically coupled. Since partial gear 246 will rotate gear 249 with which it cooperates in an impulsive manner, a full frame of tape 51a will be completely transported while shutter 31 is being automatically rotated but during the period when shutter 31 is blocking assembly 226 including lens and adjustable iris so that flicker will be avoided, synchronization will be accomplished, and tape 51a will be at a standstill when any image of any visual information frame of tape 51a is projected (also when any image is being photographed in the camera mode). Therefore, when frame rate control mechanism 22 is being rotated by motor 235 any frame rate no matter what frame rate setting dial 36 has been manually set to, said mechanism 22 will be synchronized with shutter 31 and with frames of tape 51a. A single sound track will be continuously recorded on tape 41a corresponding to the frames of visual information on tape 51a, and similarly said single sound track will be continuously reproduced in the projector mode. Tape 41a is smoothly transported by cooperation of gear 324 with another gear substituting for gear 247 of cartridge 125 and having angularly pitched threads for cooperation with the threads of gear 324. If push button 320 is added so that it may be used instead of push button 295, and contact 322 is electrically connected by means of wire to contact 242 and contact 323 is electrically connected by means of wire to contact 243, push button 320 when manually depressed so that contactor 321 cooperates with contacts 322 and 323, said push button 320 will now operate either the movie camera or projector in a similar manner as push button 295 operated the still camera-projector specific configuration when manually depressed. Similarly to the still camera-projector specific configuration, the movie camera-record mode will have switch contacts 276 in the same cooperative relationship as in the still camera-record mode and the movie projector-reproduce mode will have switch contacts 276 in the same cooperative relationship as in the still projector-reproduce mode. Likewise, switch 272 will be manually operated so that contact 273 cooperates with contact 274 in either the movie camera or move projector mode and contact 273 cooperates with contact 275 when tapes 41a and 51a of camera-projector are being rewound on storage spools. The other components except for those specifically substituted, are identical to those in the still camera-projector specific configuration, and like the still camera-projector specific configuration, cartridge 93 may be modified as therein stated for use in the movie camera-projector specific configuration. In this configuration it should be noted that push button 295 is not utilized and if desired may be electrically disconnected and physically removed. It will be remembered that in the still projector mode the still shutter was set to the bulb position and switch 301 was manually operated so as to energize solenoid 74 in order to maintain the still shutter in open position. If the said still shutter and solenoid 74 are retained in the movie camera-projector specific configuration, it is seen that switch 301 would have to be manually operated so that contact 302 cooperates with contact 303 prior to manual operation of push button 320 in order to energize solenoid 74 so as to maintain the still shutter in open mode when said shutter is set to the bulb setting and thereby permit the control of light by rotatable shutter 31 when said shutter 31 is automatically being rotated. Similarly, in the projector mode, switch 301 would have to be similarly manually operated. But in the rewind mode, switch 301 would not be operated so that contacts 302 and 303 do not cooperate with each other maintaining still shutter closed and thereby blocking entry of light and exposure of film when photographed images on tape 51a in the movie camera mode had been impinged thereon due to rotation of shutter 31 which is being driven by gear 324 of universal tape transport drive means 328 as said means 328 is being dragged due the rewind action hereinabove described.

*Similarity between the delineated and the built-up approach.*—In the still and motion camera-projector apparatus detailed in FIGS. 1, 2, 3, 4, 5, 6, 7, 8, 9, 10, 11, 17, and 18, as hereinabove described, the apparatus was described in its entirety and then delineated into its derived portions, such as the still camera with sound, the still projector with sound, the still camera-projector with sound, and the movie camera-projector with sound, wherein in the specific configuration of still and movie camera-projector as depicted by FIGS. 9, 10, 12, 13, 14, 15, and 16, the combinations of still camera-projector with sound, and the movie camera-projector with sound was built up. It can be easily seen that a separate still camera and a separate still projector with with sound could have been described as well as a separate movie camera or a separate movie projector with sound. It could also be seen that the addition of several components such as a means for positioning shutter 31 to unblock the lens assembly during still camera-projector operation could have been included in the movie camera-projector specific configuration in a similar manner as this feature was included in the still and movie camera-projector apparatus. It is therefore seen that either approach, the delineated or the built-up, may be taken to obtain combined apparatuses. Although both approaches yield substantially the same types of apparatuses, particular advantages and disadvantages are prevalent in products achieved using both approaches, the disadvantages dealing only with complexity, and these disadvantages and advantages become obvious during the recitation of the detailed specification hereinabove given.

*General notes.*—It can be seen that the still camera, still projector, or still camera-projector derived from the still and movie camera-projector apparatus may be manually operated by utilizing manual dial 12 for transportation of tapes 41 and 51. In this instances, prime mover 37 may be deleted thereby simplifying the said apparatuses.

The referred to still camera refers to a camera which photographs images of visual information which when subsequently projected are motionless as viewed on a projection screen. The still projector refers to a projector which projects images of visual information which had previously been photographed by the said still camera, and projected on a projection screen or viewer appear motionless. The still shutter refers to a shutter which has adjustable speed and bulb settings for use in connection with a still camera, a still projector, a combination still and movie camera-projection apparatus, a still camera-projector specific configuration, a movie camera-projector specific configuration, and the several configurations derived from the still and movie camera-projector apparatus as hereinabove described.

The referred to term, normal, utilized in this specification usually refers to the inoperative or electrically de-energized mode or the pre-operative or static condition particularly as depicted in the accompanying schematics.

Additionally it should be noted that the partial gears 10 and 246 of the respective universal tape transport drive means 7 and 252, or partial gear 348 of the universal tape transport rewind means 346 as hereinabove utilized and described, may be replaced with a capstan which has a high portion and a low portion profile, and where the high portion periodically cooperates with a drive means of a tape transport means for impulsively driving the tape transport means automatically when the capstan is being driven by an external means such as a prime mover as hereinabove described.

The features and principles underlying this invention as described in connection with the specific exemplifications will suggest to those skilled in the art many other modifications thereof.

I claim:

1. In combination, an apparatus having still image and movie operational modes in combination with an optical system for photographing image means upon film and a light source for projecting said image means through the optical system, comprising:
   sound track means for recording and reproducing sound relating to said image means;
   a cartridge for retaining said film and said sound track means;
   first shaft means within said cartridge for rotatably retaining said film and said sound track means thereon;
   second shaft means for intermittently advancing at least portions of the film and for smoothly advancing at least portions of the sound track means;
   first prime moving means for driving said second shaft means;
   second prime moving means coupled to the first prime moving means for controlling the rate of frame transportation of the film and for driving the second shaft means when the first prime moving means is inactivated; and
   shutter means responsive to said second prime moving means for providing optical communication of the image means through the optical system, whereby the first prime moving means is in an idling mode when the second prime moving means is activated and the second prime moving means is in an idling mode when the first prime moving means is activated for providing movie or still image operational modes of said apparatus with accompanying sound.

2. In the apparatus as stated in claim 1:
   said second prime moving means being a second motor, a frame rate control mechanism connected to the shaft of the second motor, said frame rate control mechanism having an output shaft which is responsive to rotation of the shaft of said second motor, said output shaft being connected to a second clutch which in turn is connected to a second drive means, said output shaft being adapted for driving said shutter means.

3. In the apparatus as stated in claim 1:
   said sound track means being a plural number of sound tracks, each said sound track corresponding to an individual image within a corresponding photographic frame of a plural number of photographic frames comprising said image means, said individual image being communicated motionless through said optical system.

4. In the apparatus as stated in claim 1, said cartridge comprising:
   a first pair of spools consisting of a storage and a take-up spool, mounted on a pair of stationary shafts fixedly supported within a first compartment of said cartridge for retaining said film, said first compartment having an aperture for injection of said light source therein;
   a second pair of spools consisting of a storage and a takeup spool, mounted on said pair of stationary shafts within a second compartment of said cartridge for retaining said sound track means;
   a first spiral spring attached between each of said storage spools and one of said stationary shafts, for producing rotational tension upon said storage spools during transportation of said film and sound track means upon withdrawal of said cartridge from said apparatus; and
   a second spiral spring, with lower tension than said first spiral spring, attached between each of said takeup spools and the other of said stationary shafts, for producing takeup action of said film and sound track means during transportation thereof within said apparatus.

5. In the apparatus as claimed in claim 1, said cartridge comprising:
   a film storage spool, upon which said film is stored, which has a depression at its upper end and an extension at its lower end at the axis of rotation thereof;
   a sound track means storage spool, upon which said sound track means is stored, which has a depression at its upper end and another depression at its lower end at the axis of rotation thereof, said film storage spool extension being insertable in said upper end depression of said sound track means storage spool, but maintaining freedom of rotation of one storage spool with respect to the other;
   a film takeup spool, upon which said film is taken up, having an aperture at its axis of rotation;
   a sound track means takeup spool, upon which said sound track means is taken up, having an aperture at its axis of rotation which is aligned with the aperture of said film takeup spool;
   said first shaft means comprising a first member extending into the upper end depression of said film storage spool for engaging same, said first member having a first drive means, and a second member extending into the lower end depression of said sound track means storage spool for engaging same, said second member having a second drive means, and a third member extending through the aperture of said film takeup spool for engaging same, said third member having a third drive means, and a fourth member extending through the aperture of said sound track means takeup spool for engaging same, said fourth member having a fourth drive means, said film takeup spool and said sound track means takeup spool having individual freedom of rotation with respect to each other;
   said first, second, third and fourth drive means being responsive to said second shaft means consisting of a first portion for intermittently advancing portions of the film and for smoothly advancing portions of the sound track means, and a second portion for reversing said film and said sound track means; and
   a cartridge case within which said spools and shaft members are mounted, said cartridge case having an aperture for optionally communicating light from said light source through said film.

6. The apparatus as stated in claim 1, wherein:
   the film and the sound track means within the cartridge are endless and are located within individual compartments of said cartridge and wherein the compartment in which the film is located has an aperture for injection of said light source therein.

7. The apparatus as stated in claim 1, wherein:
   said cartridge has a film retaining portion and a sound track retaining portion;
   said film located within the film retaining portion is endless;
   said sound track means located within the sound track retaining portion is endless;
   said film retaining portion has an aperture for injection of said light source; and
   means integral with the film and sound track retaining portions for interlocking said portions.

8. The apparatus as stated in clam 7, wherein:
   said film retaining portion has a labyrinth for retaining at least a portion of said endless film thereby preventing portions of said film from cooperating with each other and permitting the developing of said film within the confines of said film retaining portion.

9. In the apparatus as stated in claim 1:
   said first shaft means being a shaft with a film transport means and a tape transport means thereon for respectively guiding said film and sound track means.

10. In the apparatus as stated in claim 9:

said second shaft means being a shaft on which is mounted a partial drive means having engagement means on a portion of its periphery for periodically engaging said film transport means thereby intermittently advancing the film engaged thereby; and said shaft also has mounted thereon a full drive means having engagement means at its periphery for engaging said tape transport means thereby providing the smooth advance of the sound track means.

11. In the apparatus as stated in claim 1:

said first prime moving means being a first motor with a first clutch connected to the shaft thereof and having a first drive means which is connected to the first clutch for providing drive motion to the second shaft means.

12. The apparatus as stated in claim 11, including:

means connected to the first prime moving means for providing at least momentary deenergizing thereof after a 360 degree rotation of the shaft of said first motor.

13. The apparatus as stated in claim 1, in combination with a record-reproduce means comprising:

a head in communication with said sound track means; means for automatically starting said head from a predetermined location of said sound track means; and means for automatically translating said head in a generally oscillatory pattern over at least a portion of said sound track means, and for automatically returning said head to said predetermined location.

14. The apparatus as stated in claim 13, including:

an automatic programming means, for automatically advancing one frame of said film and one frame of said sound track means at a time, and for automatically recycling said record-reproduce means after said head had been returned to said predetermined location.

15. The apparatus as stated in claim 1, in combination with a record-reproduce means comprising:

a flux responsive head in communication with said sound track means, said sound track means being transported past said flux responsive head.

16. The apparatus as stated in claim 15, including:

an automatic programming means for automatically advancing one frame of said film and one frame of said sound track means at a time and for automatically recycling said record-reproduce means after said head had been returned to said predetermined location.

17. The apparatus as stated in claim 15, including:

programming means for automatically advancing one frame of said film and one portion of said sound track means.

References Cited

UNITED STATES PATENTS

| | | | |
|---|---|---|---|
| 1,272,798 | 7/1918 | Green | 352—138 |
| 1,971,446 | 8/1934 | Goldsmith | 352—10 |
| 2,308,260 | 1/1943 | Bakos | 352—10 |
| 3,029,684 | 4/1962 | Wilkins | 352—138 X |
| 3,233,510 | 2/1966 | Harrison | 353—15 |
| 3,276,313 | 10/1966 | Schwartz | 353—19 X |
| 1,235,997 | 8/1917 | Mottlau | 352—190 |
| 2,813,453 | 11/1957 | Browder | 352—31 |
| 2,853,923 | 9/1958 | Daniel | 352—31 |
| 2,911,882 | 11/1959 | Hicks | 352—31 |
| 2,943,535 | 7/1960 | Oxberry | 352—138 |
| 3,187,626 | 6/1965 | Mindell et al. | 352—31 |
| 3,233,957 | 2/1966 | Loveland | 352—31 |
| 3,243,250 | 3/1966 | Keznickl | 352—31 |
| 3,256,775 | 6/1966 | Hall | 352—37 |

MORTON ANSHER, Primary Examiner

MONROE H. HAYES, Assistant Examiner

U.S. Cl. X.R.

352—72, 136; 353—15